United States Patent
Kawase et al.

(10) Patent No.: US 6,939,407 B2
(45) Date of Patent: Sep. 6, 2005

(54) METHODS AND APPARATUS FOR MAKING COLOR FILTER BY DISCHARGING A FILTER MATERIAL

(75) Inventors: Tomomi Kawase, Shiojiri (JP); Hisashi Aruga, Fujimi-cho (JP); Satoru Katagami, Hara-mura (JP); Masaharu Shimizu, Hara-mura (JP); Hiroshi Kiguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/620,610

(22) Filed: Jul. 17, 2003

(65) Prior Publication Data

US 2004/0032480 A1 Feb. 19, 2004

Related U.S. Application Data

(62) Division of application No. 09/988,743, filed on Nov. 20, 2001, now Pat. No. 6,660,332.

(30) Foreign Application Priority Data

Nov. 21, 2000 (JP) ........................................ 2000-354543
Sep. 26, 2001 (JP) ........................................ 2001-294725

(51) Int. Cl.[7] .............................. B05C 11/00; B05B 3/00
(52) U.S. Cl. ....................... 118/680; 118/686; 118/313; 118/323
(58) Field of Search .............................. 118/313, 323, 118/315, 670, 680, 681, 686–687; 347/13, 43, 47, 106, 107

(56) References Cited

U.S. PATENT DOCUMENTS 5,767,875 A 6/1998 Sawada

FOREIGN PATENT DOCUMENTS

| EP | 0 761 440 A2 | 3/1997 |
|---|---|---|
| EP | 0 832 744 A2 | 4/1998 |
| EP | 0 832 752 A2 | 4/1998 |
| EP | 0 984 303 A1 | 3/2000 |
| EP | 0 992 937 A2 | 4/2000 |
| JP | A 63-295270 | 12/1988 |
| JP | A-2-165962 | 6/1990 |
| JP | A-5-31919 | 2/1993 |
| JP | A-5-261918 | 10/1993 |
| JP | A-6-143618 | 5/1994 |
| JP | A-7-52465 | 2/1995 |
| JP | A-8-11298 | 1/1996 |
| JP | 09-101412 | 4/1997 |
| JP | 09-138306 | 5/1997 |
| JP | A-9-174884 | 7/1997 |
| JP | 09-300664 | 11/1997 |
| JP | A 10-151755 | 6/1998 |
| JP | A-10-202851 | 8/1998 |
| JP | A-11-54270 | 2/1999 |
| JP | A 11-271753 | 10/1999 |
| JP | A-2000-89019 | 3/2000 |
| JP | 2000-89020 | 3/2000 |
| JP | A 2000-147241 | 5/2000 |
| JP | 2000-284113 | 10/2000 |

*Primary Examiner*—Chris Fiorilla
*Assistant Examiner*—Yewebdar Tadesse
(74) *Attorney, Agent, or Firm*—Oliff & Berridge, PLC

(57) ABSTRACT

The present invention provides a method for making a color filter having a plurality of filter elements aligned in a dot-matrix on a substrate. The method has a first-scanning step of moving the inkjet head having a nozzle line including a plurality of nozzles relative to the substrate while selectively discharging a filter material from the plurality of nozzles so as to form filter elements on filter element forming regions of the substrate and a second-scanning step of moving the inkjet head by a second-scanning distance δ in a second-scanning direction. The plurality of nozzles are divided into a plurality of groups and the first-scanning step and the second-scanning step are repeated so that all the nozzle groups scan the same section of the substrate.

5 Claims, 23 Drawing Sheets

STRIPE

MOSAIC

DELTA

METHODS AND APPARATUS FOR MAKING COLOR FILTER BY DISCHARGING A FILTER MATERIAL

This is a Divisional of application Ser. No. 09/988,743, filed Nov. 20, 2001 now U.S. Pat. No. 6,660,332. The entire disclosure of the prior application is hereby incorporated by reference herein in its entirety.

BACKGROUND OF THE INVENTION

1. Field of Invention

The present invention relates to a method and an apparatus for making a color filter used in an optical device, such as a liquid crystal display. The present invention also relates to a method and an apparatus for making a liquid crystal display having a color filter. Furthermore, the present invention relates to a method and an apparatus for making an electro-luminescent (EL) device for display using an electro-luminescent layer.

Also, the present invention relates to a method for discharging a material, and an apparatus for discharging thereof. Further, the present invention relates to electronic apparatus with a liquid crystal display device or an electro-luminescent device manufactured by the methods.

2. Description of Related Art

Currently, display devices, such as liquid crystal devices and EL devices, are increasingly used in the display sections of electronic devices, such as cellular phones and portable computers. Also recently, an increasing number of display devices are employing a full-color display. Full-color display in the liquid crystal devices is, for example, achieved by leading the light modulated by liquid crystal layers to pass through color filters. The color filters are formed by, for example, aligning dots of filter elements of red (R), green (G), and blue (B) in a predetermined configuration, such as a striped pattern, a deltoid pattern, or a mosaic pattern, on the surface of a substrate made of glass, plastic, or the like.

In order to achieve full-color display in an EL device, dots of red (R), green (G), and blue (B) electro-luminescent layers (EL layers) are aligned in a predetermined pattern, such as a striped pattern, a deltoid pattern, or a mosaic pattern, on the surface of a substrate made of glass, plastic, or the like. Each of the EL layers is then sandwiched by a pair of electrodes so as to form a pixel, and the voltage applied to these electrodes is controlled according to the individual pixels so as to make the pixels emit desired colors and to achieve full-color display.

Conventionally, patterning of the R, G, and B filter elements and patterning of the R, G, and B pixels of the electro-luminescent device have been performed by photolithography. However, photolithography is a complex and costly process because the process consumes a large amount of colored materials, photoresists, and the like.

In order to overcome these problems, the use of an inkjet method in which the filter element and electro-luminescent layers aligned in the dot-matrix are formed by discharging in a dot-matrix a filter material, an electro-luminescent material, or the like, has been suggested.

Referring to FIGS. 22A and 22B, a plurality of filter elements 303 arranged in a dot matrix are formed by means of an inkjet method in the inner regions of a plurality of panel regions 302 defined on the surface of a mother substrate 301, i.e., a large-size substrate made of glass, plastic, or the like.

Here, as shown in FIG. 22C, an inkjet head 306 having a nozzle line 305 including a plurality of nozzles 304 arranged in a row performs first-scanning a number of times (two times in FIG. 22B) relative to one panel region 302 as shown by arrows A1 and A2 in FIG. 22B. Meanwhile, during the first-scanning, ink, that is, a filter material, is selectively discharged from the plurality of nozzles 304 so as to form filter elements 303 at the desired positions.

The filter elements 303 are formed by arranging colors such as R, G, and B, in an appropriate pattern, such as a striped pattern, a deltoid pattern, or a mosaic pattern. The process of discharging ink using the inkjet head 306 shown in FIG. 22B is performed as follows: three of the inkjet heads 306, each of which discharges one of three colors from among R, G, and B, are prepared in advance; and these inkjet heads 306 are used sequentially to form a pattern of three colors, such as R, G, and B, on one mother substrate 301.

As for the inkjet head 306, generally, there is a variation between the amounts of ink discharged from the plurality of nozzles 304 constituting the nozzle line 305. Accordingly, the inkjet head 306 has an ink-discharge characteristic Q shown in FIG. 23A, for example, wherein the discharge amount is largest at the positions corresponding to both ends of the nozzle line 305, next largest at the position corresponding to the middle thereof, and least at the other positions.

Thus, when the filter elements 303 are formed using the inkjet head 306 as shown in FIG. 22B, dense lines are formed at positions P1 corresponding to the end portions of the inkjet head 306 and/or at positions P2 corresponding to the middle of the nozzle line, as shown in FIG. 23B, impairing uniformity of the in-plane light transmission characteristics of the color filter.

SUMMARY OF THE INVENTION

Accordingly, it is a feature of the present invention to provide a method and an apparatus for manufacturing an optical component which can make uniform the planar optical characteristics of the optical component, i.e., the light transmission characteristics of a color filter, the color display characteristics of a liquid crystal device, the light-emission characteristics of an electro-luminescent surface.

In achieving these features, the present invention provides a method for making a color filter with a plurality of filter elements aligned on a substrate. The method can include a step of moving one of a inkjet head and the substrate in a first-scanning direction relative to the other, wherein the inkjet head has a nozzle line including a plurality of nozzle groups each including a plurality of nozzles, a step of selectively discharging a filter material from the plurality of nozzles to form the plurality of filter elements, and a step of moving one of the inkjet head and the substrate in a second-scanning direction relative to the other so that at least a part of each nozzle group is capable of scanning the same section of the substrate in the first direction.

In accordance with the above-described method for making the color filter, each of the filter elements in the color filter is not formed by one first-scanning of the inkjet head, but instead each of the filter elements is formed into a predetermined thickness by being applied with ink n times from the plurality of nozzles belonging to different nozzle groups. Accordingly, even when there is a variation between the discharged amounts of ink among the plurality of nozzles, variations in the layer thickness among the plurality of filter elements can be avoided, and light transmission characteristics of the color filter can thereby be made uniform.

It is apparent that because the filter elements are formed by discharging ink from the inkjet head in the above-described method, complex processes such as those employing photolithography techniques are not required and the raw materials are efficiently consumed.

In the above-described method for making a color filter, one of the inkjet head and the substrate is moved relative to the other by a distance corresponding to an integral multiple of the length of one of the nozzle groups in the second-scanning direction.

In the above-described method for making a color filter, the nozzle line may be tilted relative to the second-scanning direction. The nozzle line is formed by arranging the plurality of nozzles in a line. When the nozzle line is arranged in a direction parallel to the second-scanning direction of the inkjet head, the distance between adjacent filter elements formed by the filter element material discharged from the nozzles, i.e., the element pitch, becomes equal to the distance between the adjacent nozzles constituting the nozzle line, i.e., the nozzle pitch.

If an element pitch equal to the nozzle pitch is desirable, the nozzle line need not be tilted, however such a case is rare. In most cases, the element pitch and the nozzle pitch are different. When the nozzle line is tilted relative to the second-scanning direction of the inkjet head, the distance of the nozzle pitch in the second-scanning direction can be adjusted to coincide with the element pitch. Note that although in such a case, the positions of the nozzles constituting the nozzle line are shifted in the first-scanning direction, discharge timing of the filter element material from each of the nozzles is adjusted to apply ink droplets from the nozzles to the desired positions.

In the above-described method for making a color filter, the second-scanning distance δ may be set so as to satisfy the equation:

$$\delta \approx (L/n)\cos\theta$$

wherein L represents the length of the nozzle line, n represents the number of the nozzle groups, and θ represents the angle defined by the nozzle line and the second-scanning direction. In this manner, the plurality of the nozzles in the inkjet head can be moved in the second-scanning direction according to the nozzle groups. As a result, when the nozzle line is divided into four nozzle groups, for example, all the sections of the substrate are scanned by four different nozzle groups.

In the above-described method for making a color filter, some of the nozzles located at each of two end portions of the nozzle line may be set so as not to discharge the filter element material. As described above in association with FIG. 23A, the ink-discharge distribution of a typical inkjet head changes at the two end portions of the nozzle line compared to other portions. The in-plane layer thickness of the filter element can be made uniform if the plurality of nozzles having the same ink-discharge distribution, excluding some of the nozzles at the two end portions of the nozzle line having significantly large variations, are used in the inkjet head having such ink-discharging distribution characteristics.

When the process is performed without using some of the nozzles located at the two end portions of the nozzle line as described above, the second-scanning distance δ can be set so as to satisfy the equation:

$$\delta \approx (L/n)\cos\theta$$

wherein L represents the length of the nozzle line excluding the two end portions of the nozzle line at which the nozzles not discharging the filter material are located, n represents the number of nozzle groups, and θ represents the angle defined by the nozzle line and the second-scanning direction.

Next, the color filter made by the method described above can be formed by arranging the filter elements in different colors, such as R (red), G (green), and B (blue), or C (cyan), Y (yellow), and M (magenta), in a predetermined planar pattern. In making such a color filter, a plurality of the inkjet heads, each discharging a filter material of one color selected from among these colors from the nozzle line, may be separately prepared, and the first-scanning step and the second-scanning step are sequentially repeated relative to the same substrate for each of the plurality of inkjet heads, separately.

In making the above-described color filter having the filter elements of different colors such as R, G, and B, or C, Y, and M, the inkjet head may be provided with a plurality of nozzle lines each discharging a filter material of a different color, and the first-scanning step and the second-scanning step may be performed using the inkjet head so as to simultaneously apply the filter elements of different colors onto the substrate.

The present invention also provides an apparatus for making a color filter with a plurality of filter elements aligned on a substrate. The apparatus has an inkjet head having a nozzle line comprising a plurality of nozzle groups, each including a plurality of nozzles, an ink supplying element for supplying a filter material to the inkjet head, a first-scan driving element for moving the inkjet head in a first-scanning direction relative to the other, a second-scan driving element for moving one of the inkjet head and the substrate in a second-scanning direction relative to the other, and a nozzle discharge controlling element for controlling the discharge of the filter material from the plurality of the nozzles. The inkjet head can further include a first-scan controlling element for controlling the operation of the first-scan driving element, and a second-scan controlling element for controlling the operation of the second-scan driving element, wherein one of the inkjet head and the substrate is moved in a second-scanning direction relative to the other so that at least a part of each nozzle group is capable of scanning the same section of the substrate in the first direction.

The present invention further provides a method for making a liquid crystal device. The liquid crystal device has a pair of substrates for enclosing liquid crystal, and a plurality of filter elements aligned on at least one of the substrates. And the method can include a step of moving one of a inkjet head and the substrate in a first-scanning direction relative to the other, wherein the inkjet head has a nozzle line comprising a plurality of nozzle groups each including a plurality of nozzles, a step of selectively discharging a filter material from the plurality of nozzles to form the plurality of filter elements, and a step of moving one of the inkjet head and the substrate in a second-scanning direction relative to the other so that at least a part of each nozzle group is capable of scanning the same section of the substrate in the first direction.

The present invention also provides an apparatus for making a liquid crystal device. The liquid crystal device can include a pair of substrates for enclosing liquid crystal, and a plurality of filter elements aligned on at least one of the substrates. And the apparatus can include an inkjet head having a nozzle line comprising a plurality of nozzle groups, each including a plurality of nozzles, an ink supplying element for supplying a filter material to the inkjet head, a first-scan driving element for moving the inkjet head in a first-scanning direction relative to the other, a second-scan driving element for moving one of the inkjet head and the substrate in a second-scanning direction relative to the other, and a nozzle discharge controlling element for controlling the discharge of the filter material from the plurality of the nozzles. The inkjet head can further include a first-scan controlling element for controlling the operation of the first-scan driving element, and a second-scan controlling element for controlling the operation of the second-scan driving element, wherein one of the inkjet head and the substrate is moved in a second-scanning direction relative to the other so that at least a part of each nozzle group is capable of scanning the same section of the substrate in the first direction.

The present invention also provides a method for making an electro-luminescent device. The device can include a plurality of pixels, each including an electro-luminescent layer, aligned on a substrate. And the method has a step of moving one of a inkjet head and the substrate in a first-scanning direction relative to the other, wherein the inkjet head has a nozzle line comprising a plurality of nozzle groups each including a plurality of nozzles, a step of selectively discharging an electro-luminescent material from the plurality of nozzles to form the plurality of filter elements, and a step of moving one of the inkjet head and the substrate in a second-scanning direction relative to the other so that at least a part of each nozzle group is capable of scanning the same section of the substrate in the first direction.

The present invention provides an apparatus for making an electro-luminescent device. The device can include a plurality of pixels, each including an electro-luminescent layer, aligned on a substrate. And the apparatus has an inkjet head having a nozzle line including a plurality of nozzle groups, each including a plurality of nozzles, an ink supplying element for supplying a electro-luminescent material to the inkjet head, a first-scan driving element for moving the inkjet head in a first-scanning direction relative to the other, a second-scan driving element for moving one of the inkjet head and the substrate in a second-scanning direction relative to the other, and a nozzle discharge controlling element for controlling the discharge of the filter material from the plurality of the nozzles. The inkjet head further including a first-scan controlling element for controlling the operation of the first-scan driving element, and a second-scan controlling element for controlling the operation of the second-scan driving element, wherein one of the inkjet head and the substrate is moved in a second-scanning direction relative to the other so that at least a part of each nozzle group is capable of scanning the same section of the substrate in the first direction.

The present invention further provides a control unit for controlling an inkjet head which is used in making an optical component that includes a plurality of color patterns aligned on a substrate. The control unit can include an inkjet head having a nozzle line having a plurality of nozzle groups, each including a plurality of nozzles, an ink supplying element for supplying a electro-luminescent material to the inkjet head, a first-scan driving element for moving the inkjet head in a first-scanning direction relative to the other, a second-scan driving element for moving one of the inkjet head and the substrate in a second-scanning direction relative to the other, and a nozzle discharge controlling element for controlling the discharge of the filter material from the plurality of the nozzles. The inkjet head can further include a first-scan controlling element for controlling the operation of the first-scan driving element, and a second-scan controlling element for controlling the operation of the second-scan driving element, wherein one of the inkjet head and the substrate is moved in a second-scanning direction relative to the other so that at least a part of each nozzle group is capable of scanning the same section of the substrate in the first direction.

BRIEF DESCRIPTION OF THE DRAWINGS

The invention will be described with reference to the accompanying drawings, in which like elements are referred to with like numbers, and in which.

DETAILED DESCRIPTION OF PREFERRED EMBODIMENTS

Figure 5A:
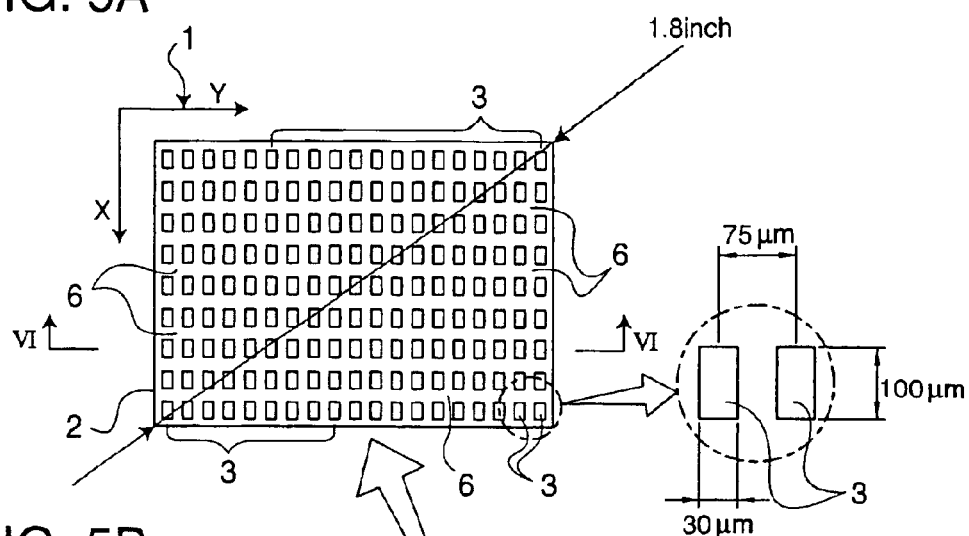
FIG. 5A is a plan view showing a color filter according to one embodiment of the present invention and FIG. 5B is a plan view showing a mother substrate thereof.

An embodiment of a manufacturing method and a manufacturing apparatus for a color filter will now be described. First, before describing this method and apparatus, a color filter manufactured by this method and apparatus is explained. FIG. 5A is a plan view of the structure of a color filter according to one embodiment. FIG. 6D shows a cross-section of the structure cut along line VI—VI in FIG. 5A.

A color filter 1 of this embodiment can be made by forming a plurality of filter elements 3 on the surface of a rectangular substrate 2 composed of glass, plastic, or the like, the plurality of filter elements 3 being arranged in a dot-pattern, i.e., dot-matrix pattern in this embodiment, and depositing an overcoat 4 thereon as shown in FIG. 6D. Note that FIG. 5A is a plan view of the color filter 1 without the overcoat 4.

Figure 7A:
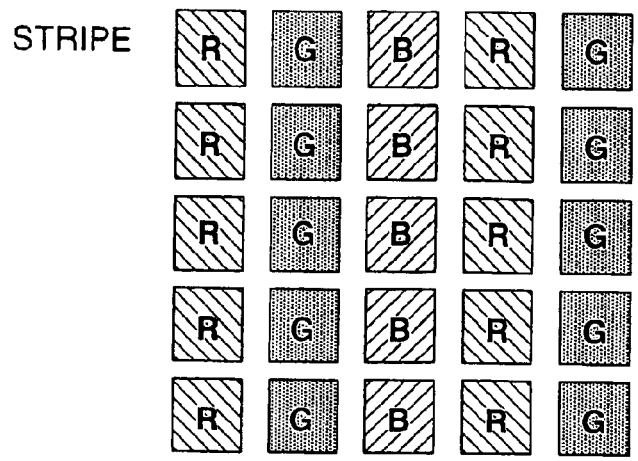
FIGS. 7A to 7C illustrate examples of patterns of R, G, and B pixels in the color filter.
Figure 7B:
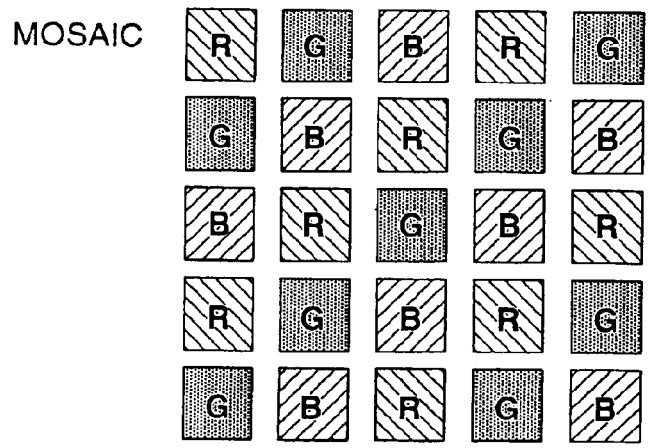
Figure 7C:
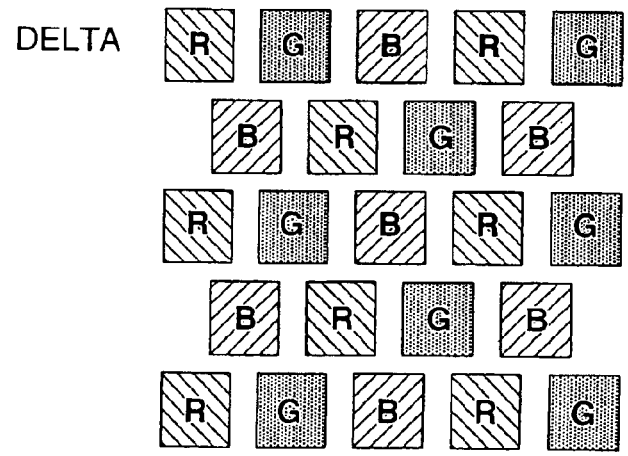

Each of the filter elements 3 can be formed by filling one of the rectangular regions which are aligned in a dot-matrix pattern and are separated from one another by a grid-shaped barrier 6 made of a resin material having no translucency, with a colored material. Each of the filter elements 3 is formed of one colored material selected from red (R), green (G), and blue (B), and the filter elements 3 of these colors are arranged in a predetermined pattern. Examples of this pattern known in the art are a striped pattern shown in FIG. 7A, a mosaic pattern shown in FIG. 7B, and a deltoid pattern shown in FIG. 7C.

In the striped pattern, each of the vertical columns of the matrix is of one color. In the mosaic pattern, any three filter elements aligned vertically or horizontally are of the three colors, namely, R, G, and B. In the delta pattern, each alternate row is shifted and any three adjacent filter elements are of the three colors, namely, R, G, and B.

The size of the color filter 1 is, for example, 1.8 inches. The dimensions of each of the filter elements 3 are, for example, 30 $\mu$m×100 $\mu$m. The space between each of the filter elements 3, i.e., the element pitch, is, for example, 75 $\mu$m.

When the color filter 1 of this embodiment is employed as an optical element for full color display, three filter elements 3 in R, G, and B as one unit constitute one pixel, and light is selectively passed through one of or a combination of R, G, and B contained in one pixel to achieve the full color display. Meanwhile, the barrier 6 composed of a resin material having no translucency acts as a black matrix.

Figure 5B:
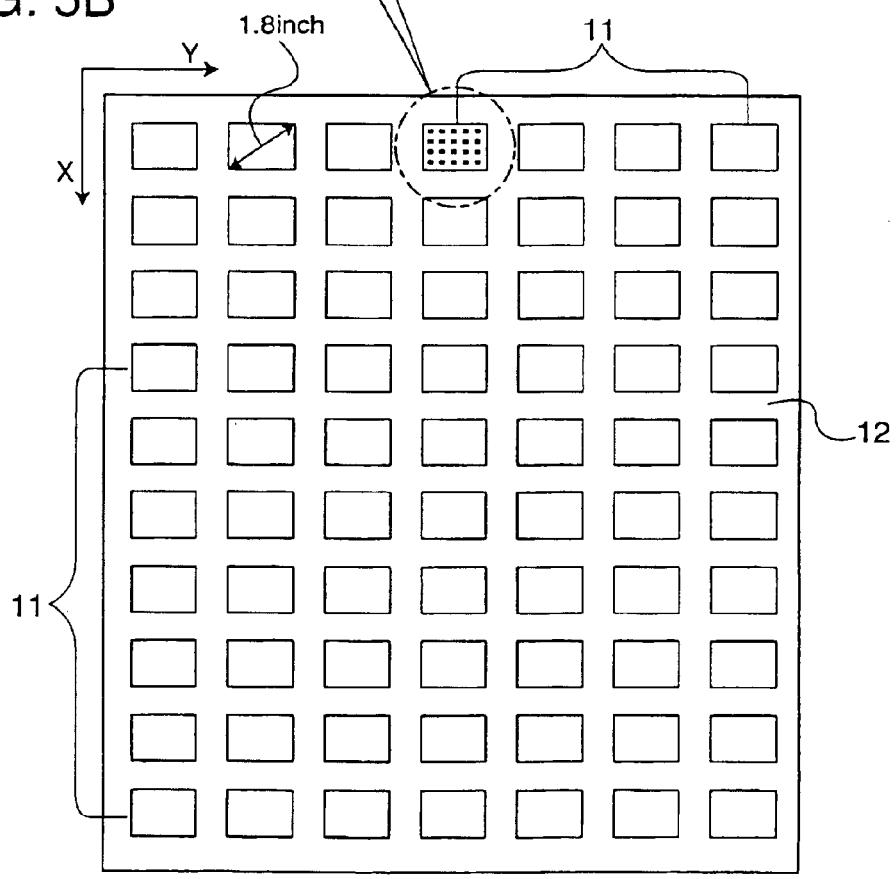

The above-described color filter 1 is cut out from, for example, a large-size mother substrate 12 shown in FIG. 5B. More specifically, a pattern corresponding to one color filter 1 is formed on the surface of each of the color filter forming regions 11 defined in the mother substrate 12, grooves for cutting are formed around the color filter forming regions 11, and the mother substrate 12 is cut along these grooves to form the individual color filters 1.

The method and apparatus for manufacturing the color filter 1 shown in FIG. 5A will be described below.

FIGS. 6A to 6D illustrate the method for manufacturing the color filter 1 by steps. First, the barrier 6 having a grid-shaped pattern when viewed from the direction of arrow B is formed on the surface of the mother substrate 12 using a resin material having no translucency. Openings 7 of the grid-shaped pattern are the regions in which the filter elements 3 are formed, i.e., the filter element regions. The planar dimensions of each of the filter element regions 7 formed by this barrier 6 as viewed from the direction of arrow B are, for example, approximately 30 $\mu$m×100 $\mu$m.

The barrier 6 has both functions of preventing the flow of a filter element material supplied in the filter element regions 7 and of acting as a black matrix. The barrier 6 is formed by a desired patterning technique, such as photolithography, and may be heat-treated using a heater if necessary.

Figure 6A:
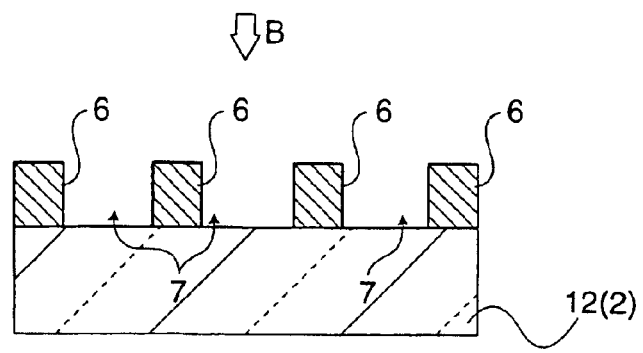
FIGS. 6A to 6D are cross-sectional views taken along line VI—VI in FIG. 5A for illustrating steps for making a color filter.
Figure 6B:
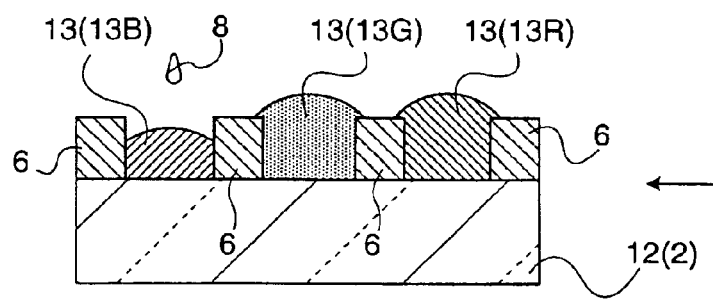

After forming the barrier 6, droplets 8 of a filter element material 13 are supplied to each of the filter element regions 7 in order to fill each of the filter element regions 7 with a filter element material 13, as shown in FIG. 6B. In FIG. 6B, reference numeral 13R denotes a red (R) filter element material, reference numeral 13G denotes green (G) a filter element material, and reference numeral 13B denotes a blue (B) filter element material.

Figure 6C:
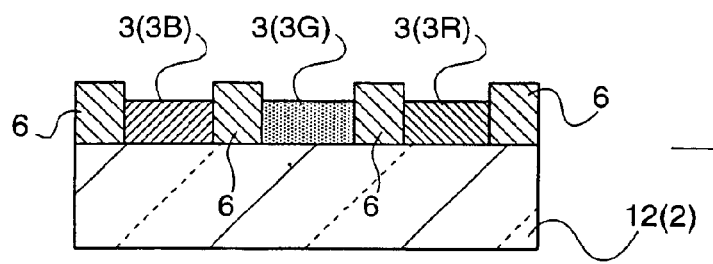
Figure 6D:
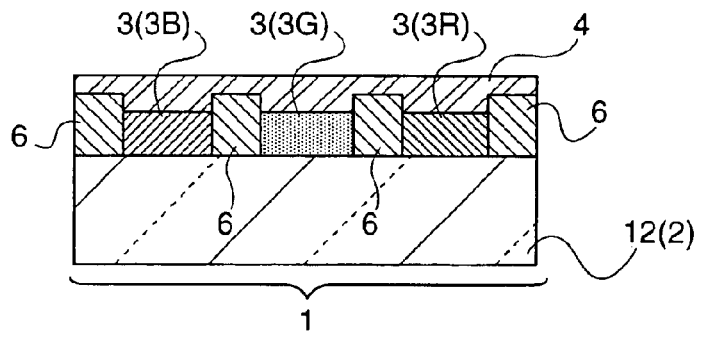

After a predetermined amount of the filter element material 13 is placed in each of the filter element regions 7, the mother substrate 12 is heated using a heater to, for example, approximately 70° C., in order to evaporate the solvent contained in the filter element material 13. Because of this evaporation, the filter element material 13 decreases in volume and is planarized, as shown in FIG. 6C. If the decrease in the volume is excessively large, the supplying of the filter element material droplets and heating of the supplied droplets are repeated until a layer thickness sufficient for the color filter 1 is obtained. Through the above-described process, only the solid content of the filter element material 13 remains and forms layers, thereby yielding the filter elements 3 in the desired colors.

After the filter elements 3 are formed as above, heat treatment at a predetermined temperature for a predetermined time is performed to completely dry the filter elements 3. Subsequently, the overcoat 4 is formed using a suitable method such as a spin coating method, a roll coating method, a ripping method, or an inkjet method, for example. The overcoat 4 is formed to protect the filter elements 3, etc., and to planarize the surface of the color filter 1.

Figure 8:
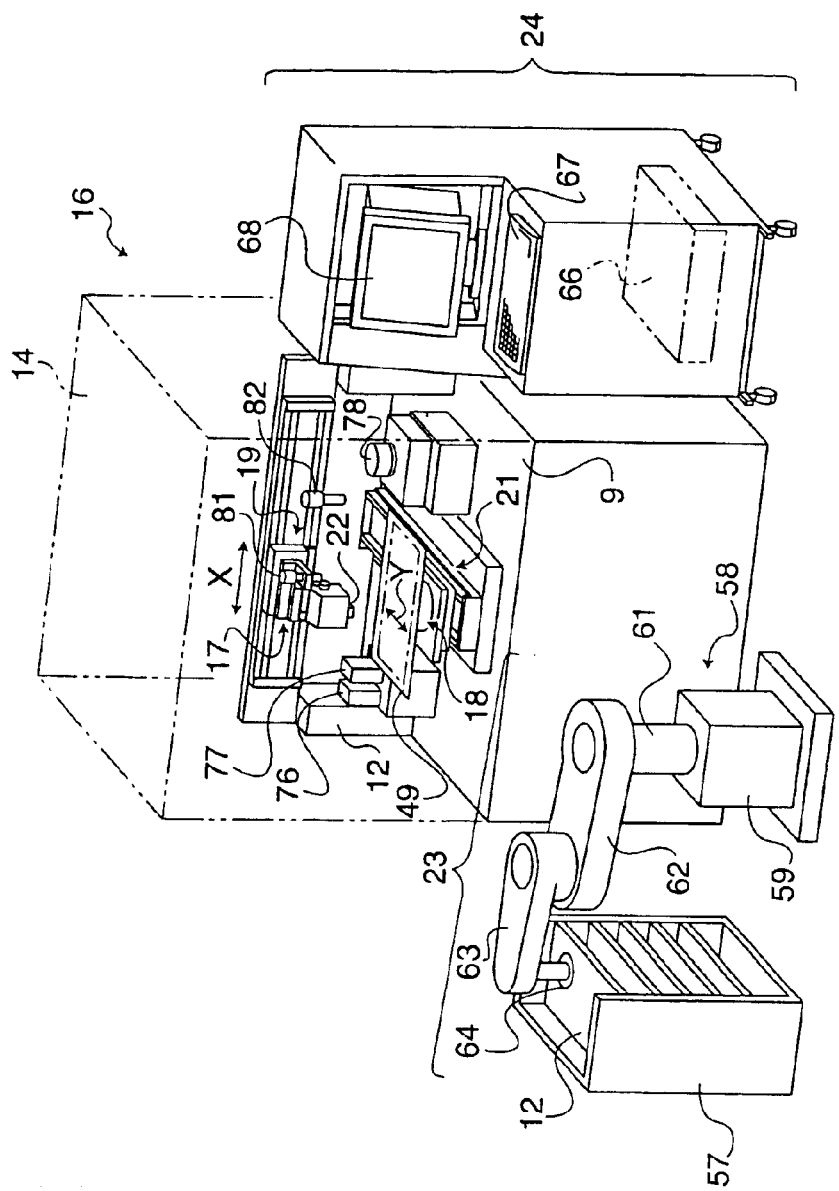
FIG. 8 is a perspective view of an embodiment of an inkjet apparatus which is the main unit of each of the apparatuses for making a color filter, a liquid crystal device, and an electro-luminescent device according to the present invention.

FIG. 8 shows an embodiment of an inkjet apparatus 16 for supplying the filter element material 13 shown in FIG. 6B. The inkjet apparatus 16 discharges ink droplets of the filter element material 13 of one color selected from among R, G, and B, for example, R, and deposits the droplets on predetermined positions in each of the color filter forming regions 11 in the mother substrate 12 (refer to FIG. 5B). Although inkjet apparatuses for a green filter element material 13g and for a blue color filter element material 13B are prepared separately, the structures thereof are similar to that shown in FIG. 8 and the description thereof is omitted.

In FIG. 8, the inkjet apparatus 16 can include a head unit 26 having an inkjet head 22, a head position controller 17 for controlling the position of the inkjet head 22, a substrate position controller 18 for controlling the position of the mother substrate 12, a first-scan driving unit 19 for moving the inkjet head 22 in the first-scanning direction relative to the mother substrate 12, a sub-scan driving unit 21 for moving the inkjet head 22 in the second-scanning direction relative to the mother substrate 12, a substrate placing unit 23 for placing the mother substrate 12 to a predetermined work position in the inkjet apparatus 16, and a control unit 24 for controlling the overall operation of the inkjet apparatus 16.

The head position controller 17, the substrate position controller 18, the first-scan driving unit 19 for moving the inkjet head 22 in the first-scanning direction relative to the mother substrate 12, and the sub-scan driving unit 21 are disposed on a base 9. These are covered by a cover 14, if necessary.

Figure 10:
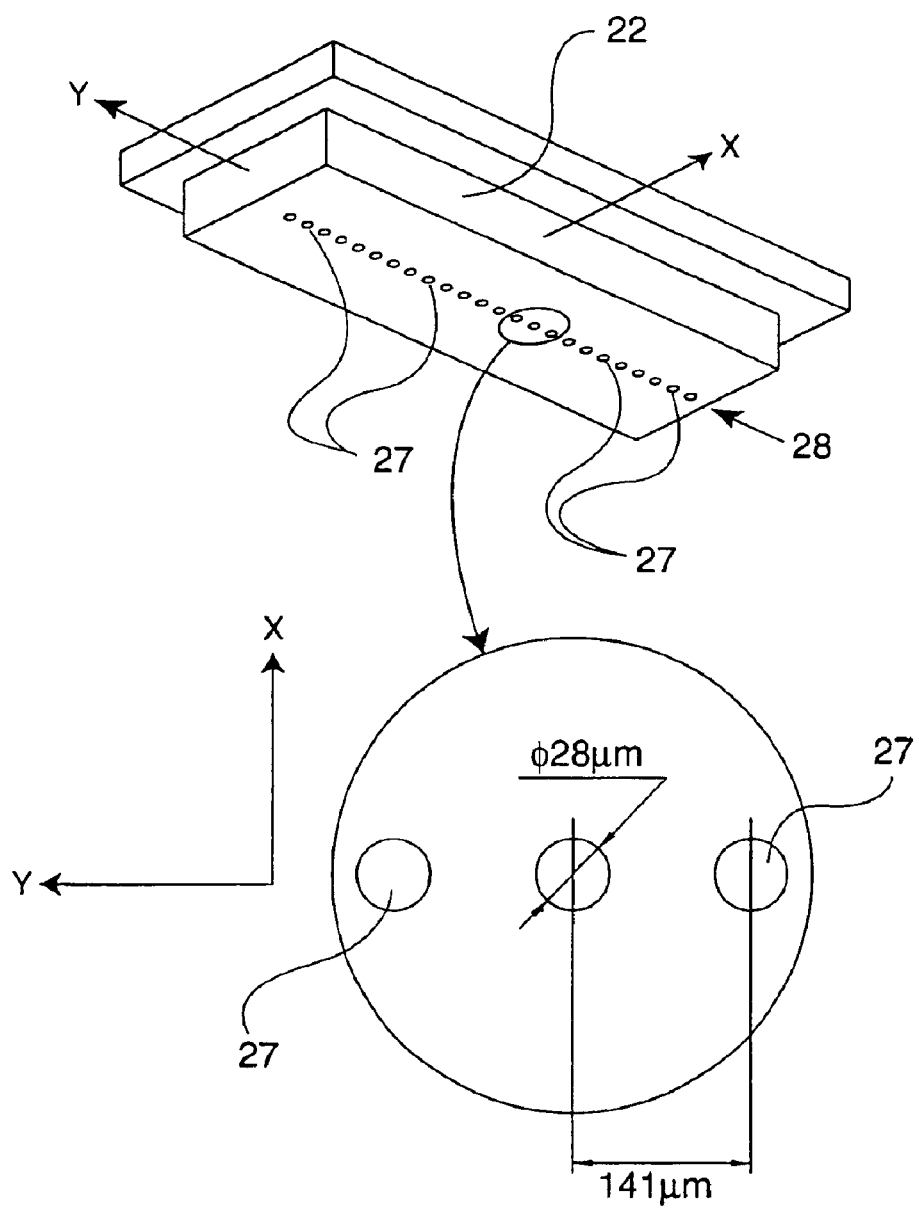
FIG. 10 is an enlarged perspective view of an inkjet head which is the main unit of the apparatus shown in FIG. 9.

The inkjet head 22 has, as shown in FIG. 10, for example, a nozzle line 28 formed by aligning a plurality of nozzles 27. The number of the nozzles 27 is, for example, 180, and the size of the opening of each nozzle 27 is, for example, 28 μm. The nozzle pitch between the nozzles 27 is, for example, 141 μm. In FIG. 10, the first-scanning direction X and the second-scanning direction Y orthogonal to the first-scanning direction X relative to the color filter 1 and the mother substrate 12 shown in FIGS. 5A and 5B are set as indicated in the drawing.

The inkjet head 22 is so positioned that the nozzle line 28 extends in the orthogonal direction to the first-scanning direction X and selectively discharges ink, i.e., a filter element material, from the plurality of nozzles 27 while moving in the first-scanning direction X in a parallel manner in order to apply the filter element material to predetermined positions in the mother substrate 12 (refer to FIG. 5B). Also, since the inkjet head 22 can be moved in the second-scanning direction Y by a predetermined distance in a parallel manner, the first-scanning position of the inkjet head 22 can be shifted by such a distance.

Figure 12A:
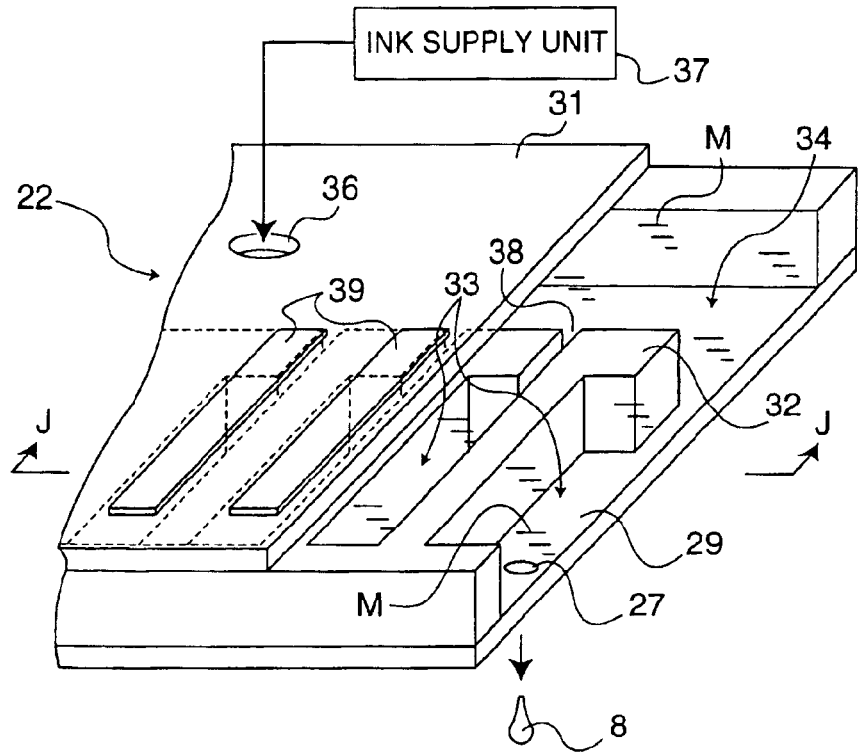
FIG. 12A is a partly sectioned perspective view showing the inner structure of the inkjet head and FIG. 12B is a cross-sectional view taken along line J—J in FIG. 12A.
Figure 12B:
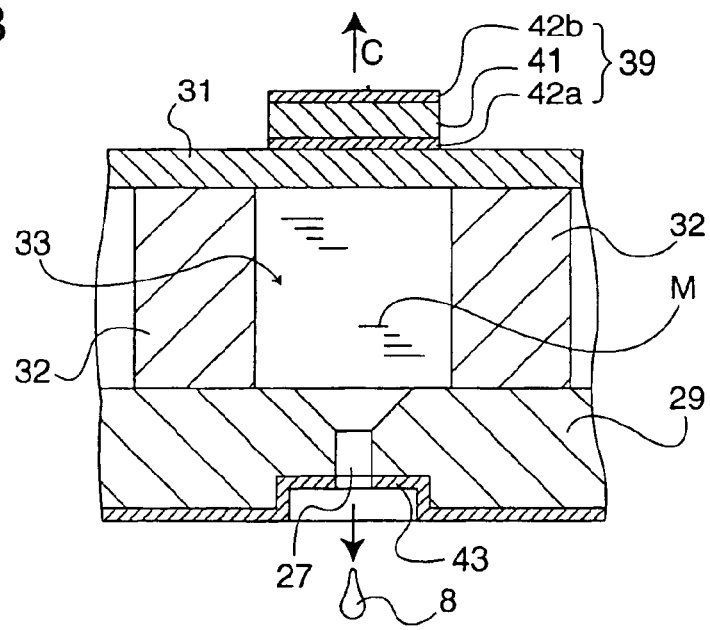

The inkjet head 22 has, for example, an internal structure as shown in FIGS. 12A and 12B. More particularly, the inkjet head 22 has a nozzle plate 29 made of stainless steel, an opposing vibrating plate 31, and a plurality of partition members 32 for joining them. Between the nozzle plate 29 and the vibrating plate 31, a plurality of ink chambers 33 and a liquid pool 34 are formed by the plurality of partition members 32.

Each of the plurality of ink chambers 33 and the liquid pool 34 are connected to each other through a channel 38.

An ink supplying hole 36 is formed at an appropriate position in the vibrating plate 31, and an ink supplying unit 37 is connected to the ink supplying hole 36. The ink supplying unit 37 supplies a filter element material M of one color selected from among R, G, and B, for example, R, to the ink supplying hole 36. The supplied filter element material M fills the liquid pool 34, flows into the channel 38, and fills the ink chamber 33.

The nozzle plate 29 has the nozzles 27 for jet-discharging the filter element material M from the ink chambers 33. Moreover, ink pressurizing members 39 associated with the ink chambers 33 are installed on the rear surface of the vibrating plate 31 which is opposite to the surface on which the ink chambers 33 are formed. Each of the ink pressurizing members 39 has, as shown in FIG. 12B, a piezoelectric element 41 and a pair of electrodes 42a and 42b sandwiching the piezoelectric element 41. The piezoelectric element 41 flexibly deforms and protrudes outward in the direction shown by arrow C when electricity is supplied to the electrodes 42a and 42b, thereby increasing the volume of the ink chamber 33. The filter element material M at an amount equivalent to this increase then flows into the ink chamber 33 from the liquid pool 34 via the channel 38.

When the electricity supply to the piezoelectric element 41 is ceased, both the piezoelectric element 41 and the vibrating plate 31 return to their original shapes. Since the volume of the ink chamber 33 also returns to its original volume, the pressure applied to the filter element material M contained in the ink chamber 33 is increased, and the droplets 8 of the filter element material M are thereby discharged from the nozzle 27 toward the mother substrate 12 (refer to FIG. 5B). An ink-repellent layer 43 which is, for example, an Ni-tetrafluoroethylene deposited layer, is provided at the peripheral region of each nozzle 27 in order to prevent the flying droplets 8 from deviating and the nozzles 27 from clogging.

Figure 9:
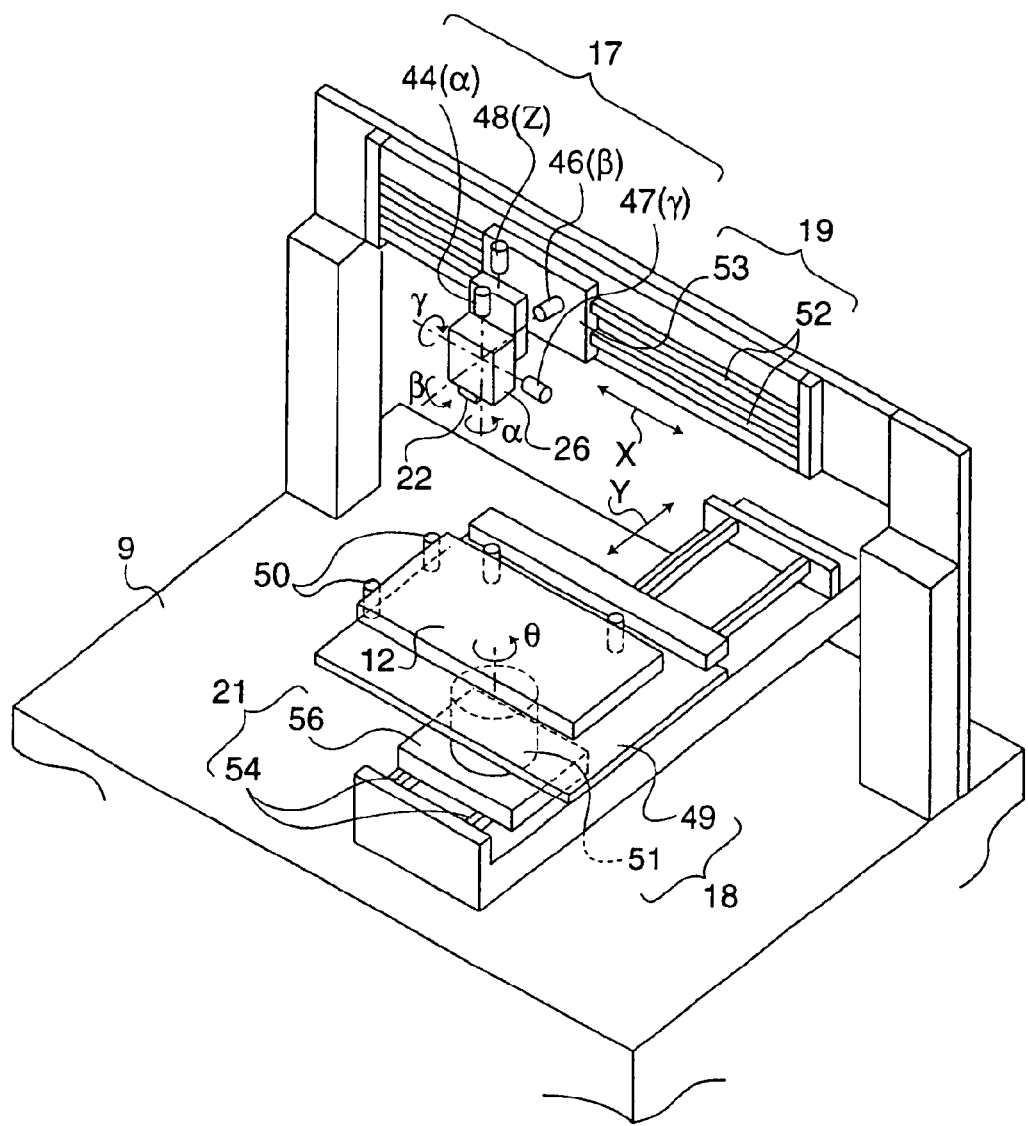
FIG. 9 is an enlarged perspective view of the main section of the apparatus shown in FIG. 8.

In FIG. 9, the head position controller 17 has an α motor 44 for rotating the inkjet head 22 in an in-plane direction, a β motor 46 for rotating the inkjet head 22 about an axis parallel to the second-scanning direction Y, a y motor 47 for rotating the inkjet head 22 about an axis parallel to the first-scanning direction X, and a Z motor 48 for moving the inkjet head 22 upward and downward in a parallel manner.

The substrate position controller 18 shown in FIG. 8 has, as shown in FIG. 9, a table 49 for receiving the mother substrate 12 and a θ motor 51 for rotating the table 49 in an in-plane direction as indicated by arrow θ. The first-scan driving unit 19 shown in FIG. 8 has, as shown in FIG. 9, guide rails 52 extending in the first-scanning direction X and a slider 53 having a pulse-driven internal linear motor. The slider 53 moves in the first-scanning direction Y along the guide rails 52 in a parallel manner when the internal linear motor is operated.

The sub-scan driving unit 21 shown in FIG. 8 has, as shown in FIG. 9, guide rails 54 extending in the second-scanning direction Y and a slider 56 having a pulse-driven internal linear motor. The slider 56 moves in the second-scanning direction Y along the guide rails 54 in a parallel manner when the internal linear motor is operated.

The pulse-driven linear motor provided in the slider 53 or the slider 56 is capable of precisely controlling the rotation angle of the output axis using pulse signals fed to the motor; accordingly, the position of the inkjet head 22, which is supported by the slider 53, relative to the first-scanning direction X, and the position of the table 49 relative to the second-scanning direction Y, or the like can be controlled with high precision.

It is to be understood that the position control of the inkjet head 22 or the table 49 is not limited to the position control employing a pulse motor but can be achieved by any desired controlling method, such as a feed-back control using a servo motor, without departing from the spirit and scope of the present invention.

The substrate placing unit 23 shown in FIG. 8 has a substrate accommodating section 57 for accommodating the mother substrate 12 and a robot 58 for transporting the mother substrate 12. The robot 58 has a base block 59 to be placed on an installation surface such as a floor or the ground, an elevating shaft 61 which moves upward and downward relative to the base block 59, a first arm 62 which rotates about the elevating shaft 61, a second arm 63 which rotates in relation to the first arm 62, and a suction pad 64 provided at the bottom face of the tip of the second arm 63. The suction pad 64 is capable of holding the mother substrate 12 by air suction, or the like.

In FIG. 8, a capping unit 76 and a cleaning unit 77 are arranged at one side of the sub-scan driving unit 21 and on the path of the inkjet head 22 driven by the first-scan driving unit 19 to perform first-scanning. An electrobalance 78 is arranged at the other side thereof. The cleaning unit 77 cleans the inkjet head 22. The electrobalance 78 measures the weight of the ink droplet discharged from each of the nozzles 27 (refer to FIG. 10) in the inkjet head 22 according to the individual nozzles. The capping unit 76 prevents the nozzles 27 (refer to FIG. 10) from drying out when the inkjet head 22 is in a stand-by state.

A head camera 81 which moves together with the inkjet head 22 is disposed in the vicinity of the inkjet head 22. A substrate camera 82 supported by a supporting unit (not shown) formed on a base 9 is disposed at a position from which the mother substrate 12 can be photographed.

As further shown in FIG. 8, the control unit 24 has a main computer unit 66 accommodating a processor, a key board 67 which is an input device, and a CRT (Cathode Ray Tube) display 68 which is a display device. The processor has, as shown in FIG. 14, a CPU (Central Processing Unit) 69 for arithmetic processing and a memory for storing various types of information, i.e., an information storing medium 71.

Figure 14:
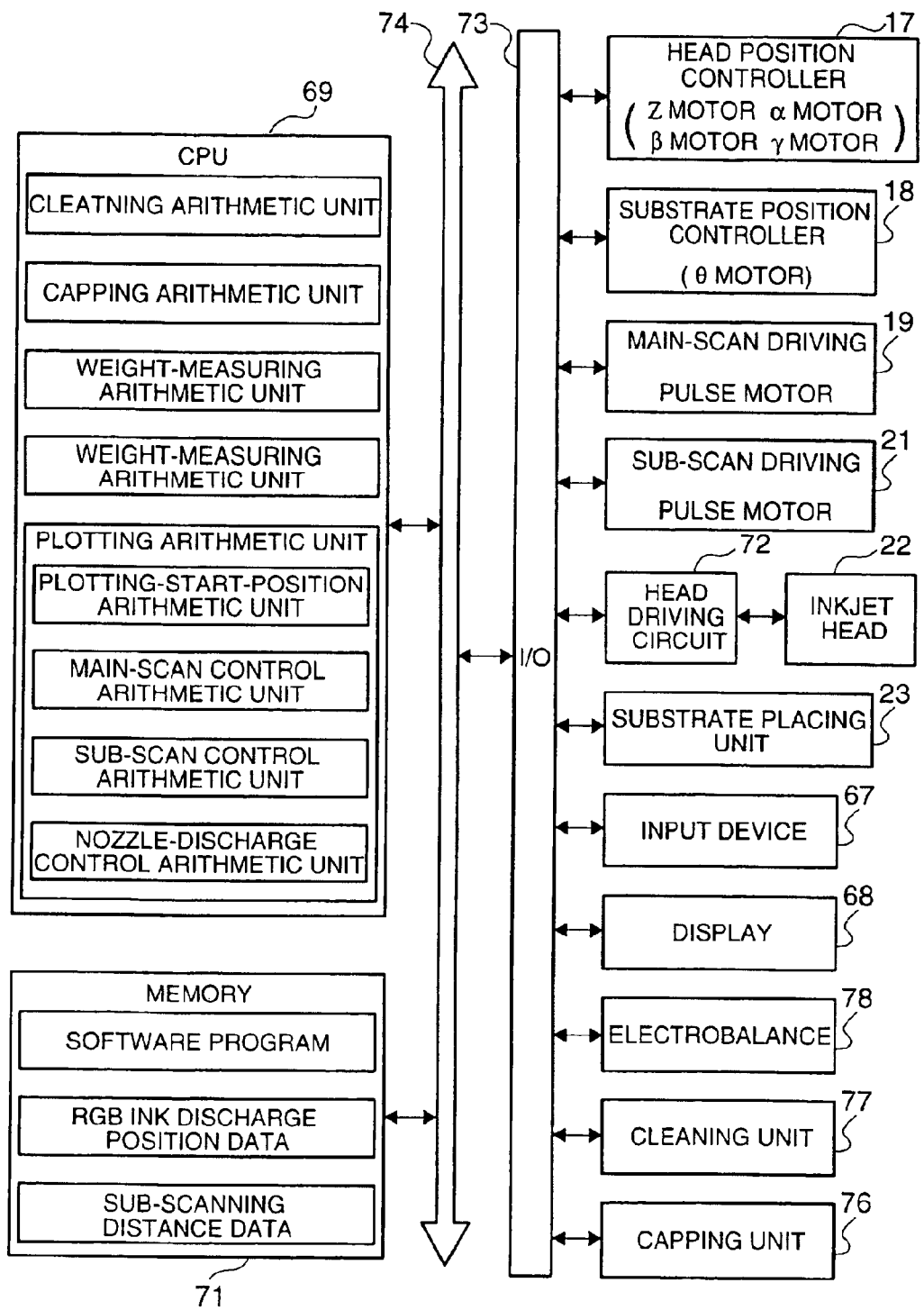
FIG. 14 is a block diagram showing an electric control system used in an inkjet head unit.

The head position controller 17, the substrate position controller 18, the first-scan driving unit 19, and the sub-scan driving unit 21 shown in FIG. 8, and a head driving circuit 72 for driving the piezoelectric element 41 (refer to FIG. 12B) inside the inkjet head 22 are each connected to the CPU 69 via an input-output interface 73 and a bus 74, as shown in FIG. 14. The substrate placing unit 23, the input device 67, the display 68, the electrobalance 78, the cleaning unit 77, and the capping unit 76 are also each connected to the CPU 69 via the input-output interface 73 and the bus 74.

The concept of a memory 71 includes a semiconductor memory such as a RAM (Random Access Memory) and a ROM (Read Only Memory) and an external memory such as a hard disk, a CD-ROM reader, and a disk-type storing medium. In terms of its function, various types of memory areas such as a memory area for storing a program software in which a procedure for controlling the inkjet apparatus 16 is written, a memory area for storing coordinate data of the positions in the mother substrate 12 (refer to FIG. 5) at which one color selected from among R, G, and B is discharged to achieve an RGB pattern as shown in FIG. 7, a memory area for storing the second-scanning distance of the mother substrate 12 in the second-scanning direction Y in FIG. 9, an area which functions as a work area for the CPU 69, a temporary file, etc., and the like are set therein.

The CPU 69 controls the operation of discharging the ink, i.e., the filter element material, at predetermined positions on the surface of the mother substrate 12 according to the program software stored in the memory 71, and has a cleaning arithmetic unit for executing a cleaning process, a capping arithmetic unit for executing a capping process, and a weight-measuring arithmetic unit for executing weight-measuring using the electrobalance 78 (refer to FIG. 8), and a plotting arithmetic unit for executing the plotting of the filter element material by the inkjet method.

To describe the plotting arithmetic unit in detail, there are various kinds of operation arithmetic units such as a plotting-start-position arithmetic unit for setting the inkjet head 22 to a starting position for plotting, a main-scan control arithmetic unit for moving the inkjet head 22 in the first-scanning direction X at a predetermined rate for scanning, a sub-scan control arithmetic unit for executing a control for shifting the mother substrate 12 in the second-scanning direction Y by a predetermined second-scanning distance, and a nozzle-discharge control arithmetic unit for controlling discharge of the ink, that is, the filter element material, by controlling which of the plurality of nozzles 27 in the inkjet head 22 is operated.

It should be noted that in this embodiment, the above-described functions are achieved by a software program using the CPU 69; however, the above-described functions can be achieved by a single electronic circuit without using a CPU, such an electronic circuit can be employed instead.

Now, the operation of the inkjet apparatus 16 having the above configuration will be described in greater detail with reference to the flowchart shown in FIG. 15.

After an operator turns on the inkjet apparatus 16, an initial setting is executed in Step S1. In particular, the head unit 26, the substrate placing unit 23, the control unit 24, etc., are set to an initial state determined in advance.

When a weight measuring timing arrives (Y in Step S2), the head unit 26 shown in FIG. 9 is moved by the first-scan driving unit 19 up to the position of the electrobalance 78 shown in FIG. 8 (Step S3), and the weight of the ink discharged from the nozzles 27 is measured using the electrobalance 78 (Step S4). The voltage applied to the piezoelectric elements 41 associated with the nozzles 27 is then optimized according to the ink discharge characteristics of the nozzles 27 (Step S5).

Next, if a cleaning timing arrives (Y in Step S6), the head unit 26 is moved by the first-scan driving unit 19 up to the position of the cleaning unit 77 (Step S7), and the cleaning unit 77 cleans the inkjet head 22 (Step S8).

If the weight measuring timing or the cleaning timing does not arrive (N in Steps S2 and S6) or if these processes are completed, the substrate placing unit 23 shown in FIG. 8 is operated to place the mother substrate 12 on the table 49 in Step S9. In particular, the suction pad 64 sucks and holds the mother substrate 12 placed inside the substrate accommodating unit 57, transfers the mother substrate 12 to the table 49 by moving the elevating shaft 61, the first arm 62, and the second arm 63, and pushes the mother substrate 12 against positioning pins 50 (FIG. 9) prearranged at suitable positions on the table 49 to prevent displacement of the mother substrate 12. Note that in order to prevent displacement of the mother substrate 12 on the table 49, it is preferable that the mother substrate 12 be fixed to the table 49 by means of air suction or the like.

Next, while observing the mother substrate 12 by the substrate camera 82 shown in FIG. 8, the output axis of the θ motor 51 shown in FIG. 9 is rotated in a micro angle mode so as to rotate the table 49 in an in-plane direction in the micro angle mode and to determine the position of the mother substrate 12 (Step S10). Next, while observing the mother substrate 12 by the head camera 81 shown in FIG. 8, the starting position at which the inkjet head 22 starts to plot patterns is determined by calculation (Step S11), and the first-scan driving unit 19 and the sub-scan driving unit 21 are properly operated to move the inkjet head 22 to the plotting starting position (Step S12).

Figure 1:
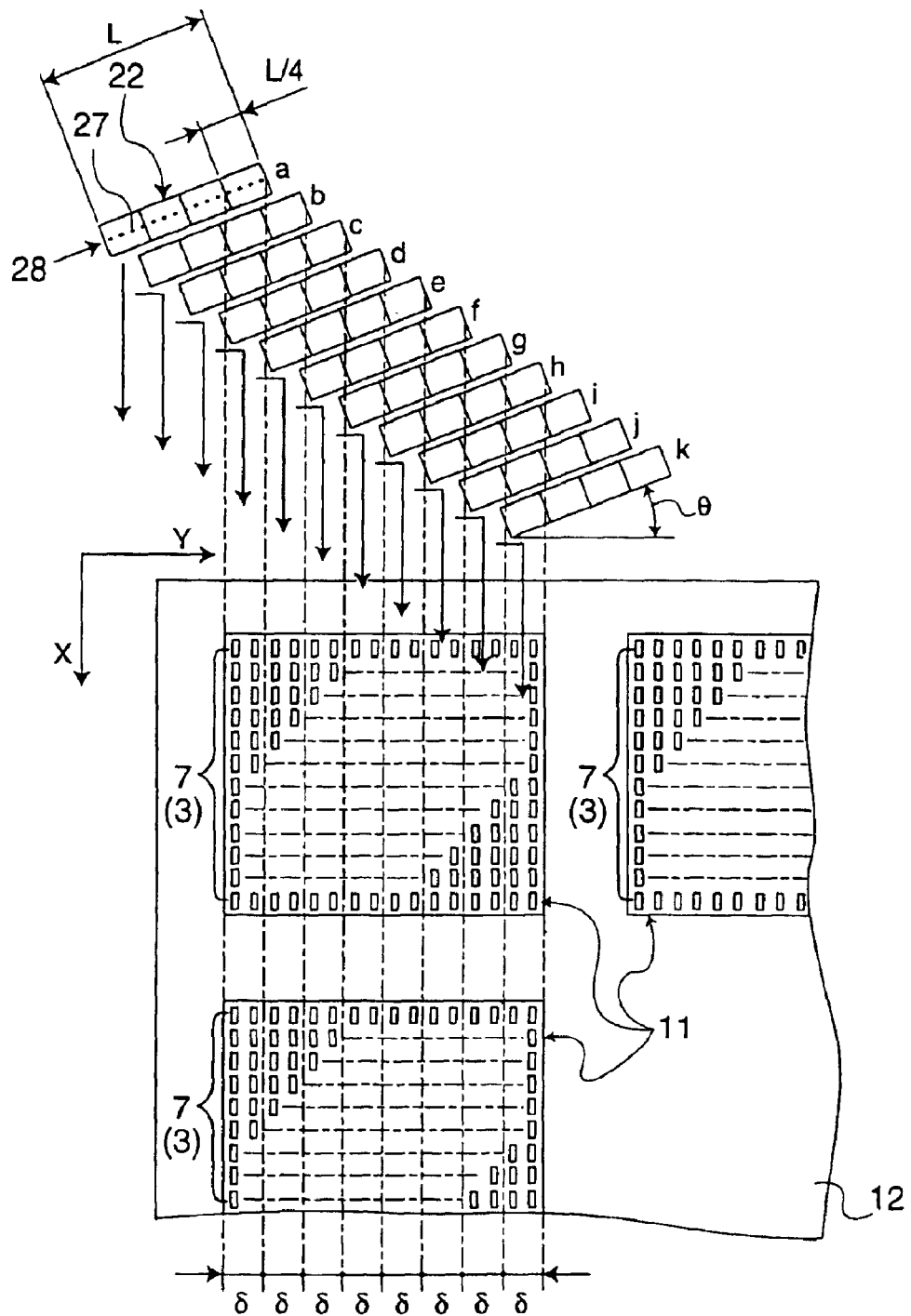
FIG. 1 is a plan view illustrating main steps of a method for making a color filter according to an embodiment of the present invention.

At this time, the inkjet head 22 is arranged in a tilted position such that the nozzle line 28 forms an angle θ relative to the second-scanning direction Y of the inkjet head 22, as shown by position (a) in FIG. 1. This is because in a typical inkjet apparatus, a nozzle pitch, which is a space between adjacent nozzles 27, does not coincide with an element pitch, which is a space between the adjacent filter elements 3, i.e., the filter element forming regions 7, and steps are required to make the dimension of the nozzle pitch in the second-scanning direction Y geometrically equal to the element pitch when the inkjet head 22 is moved in the first-scanning direction X.

Figure 15:
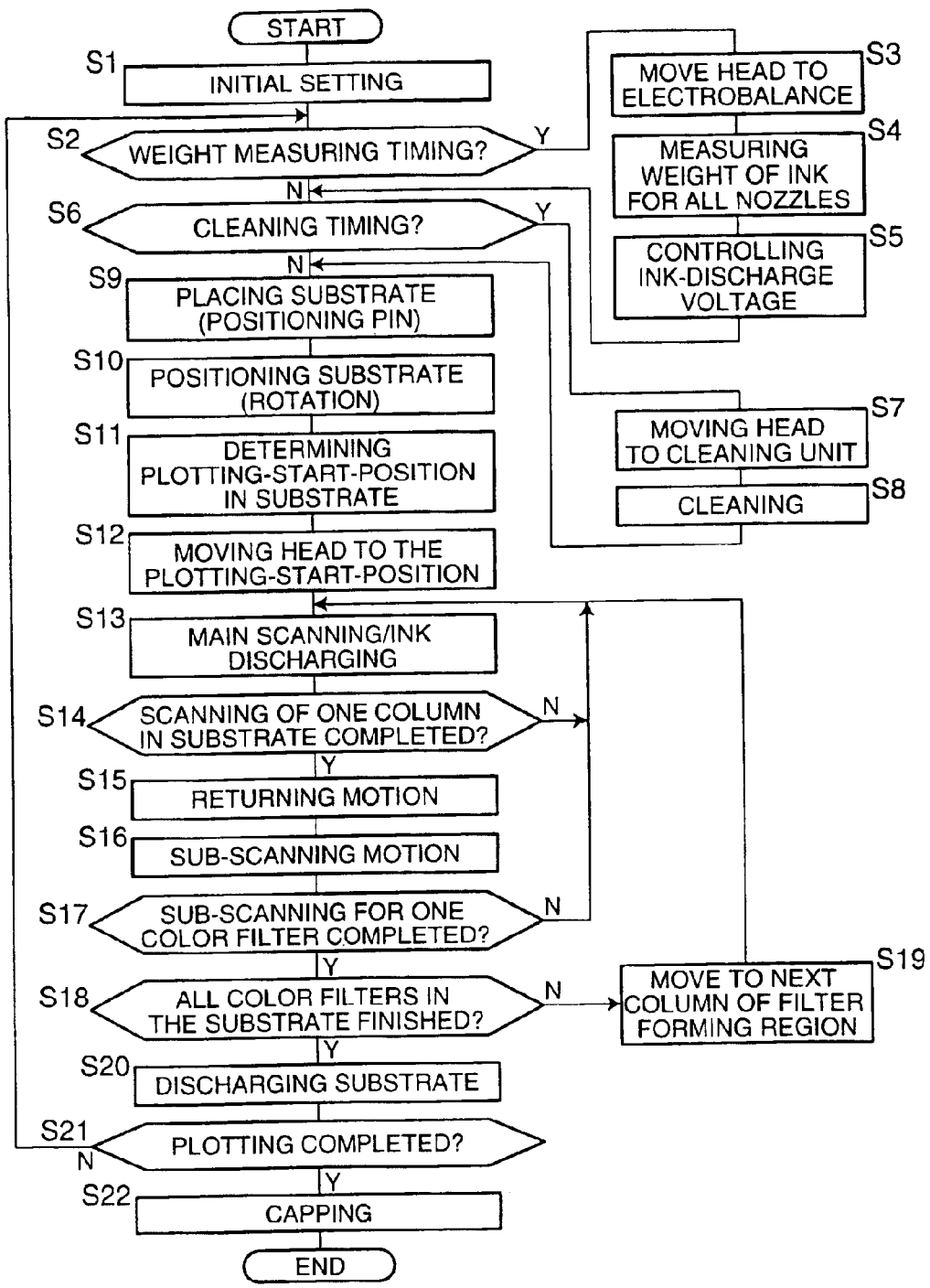
FIG. 15 is a flowchart of a control executed by the control system shown in FIG. 14.

When the inkjet head 22 is placed on the plotting starting position in Step S12 in FIG. 15, the inkjet head 22 is placed in the position (a) in FIG. 1. Subsequently, in Step S13 in FIG. 15, the main scan in the first-scanning direction X is started and, at the same time, ink is started to be discharged. In particular, the inkjet head 22 operated by the first-scan driving unit 19, shown in FIG. 9, starts linear scanning motion at a predetermined rate in the first-scanning direction X shown in FIG. 1, and during this motion, ink, i.e., the filter element material, is discharged from the nozzles 27 when the nozzles 27 reach the corresponding filter element regions 7 to which ink is supplied.

It is to be noted that the amount of ink discharged at this time is a fraction of the whole amount, one fourth of the whole amount in this embodiment, and not an amount which fills the entire volume of the filter element region 7. As will be described in later sections, each of the filter element regions 7 is not filled just by discharging ink once, but by repeating the discharge of the ink for a number of times. In this embodiment, discharge is performed four times before filling the entire volume.

When first-scanning of one line is completed relative to the mother substrate 12 (Y in Step S14), the inkjet head 22 returns to the initial position (a) (Step S15). Furthermore, the inkjet head 22 is driven by the sub-scan driving unit 21 to move in the second-scanning direction Y by a predetermined second-scanning distance δ (Step S16).

In this embodiment, the CPU 69 conceptually divides the plurality of nozzles 27 constituting the nozzle line 28 of the inkjet head 22 into a plurality of groups n. In this embodiment, n=4, that is, the nozzle line 28 of a length L composed of 180 nozzles 27 is divided into four groups. In this manner, one nozzle group contains 180/4=45 of the nozzles 27 and has a length of L/n, i.e., L/4. The above-described second-scanning distance δ is set to the length in the second-scanning direction of the nozzle group having a length of L/4, i.e., (L/4)cos θ.

Accordingly, the inkjet head returned to the initial position (a) after completion of the main scan of one line moves a distance δ in the second-scanning direction Y in FIG. 1 in a parallel manner to be at position (b). Note that although the position (b) is shifted in the first-scanning direction X relative to the position (a) in FIG. 1, this is done to facilitate explanation and the actual position (b) relative to the first-scanning direction X is the same as the position (a).

After completing the second-scanning motion to the position (b), the inkjet head repeats the first-scanning motion and discharging of ink in Step S113. During this first-scanning motion, ink discharged from the first front nozzle group lands on the second line in the color filter forming region 11 on the mother substrate 12 for the first time, and ink discharged from the second front nozzle group lands on the first line for the second time.

Subsequently, the inkjet head 22 repeats the second-scanning motion to positions (c) to (k) and repeats the first-scanning motion and discharging of the ink (Steps S13 to S16) until an ink-application process for one column of the color filter forming regions 11 of the mother substrate 12 is completed. In this embodiment, because the second-scanning distance δ is determined by dividing the nozzle line 28 into four groups, each of the filter element regions 7 is subjected to the ink discharging process four times, i.e., once for each of the four nozzle groups, which are therefore filled with a predetermined amount of ink, i.e., the filter element material, when the first-scanning and second-scanning for one column of the color filter forming regions 11 are completed.

When discharging of the ink for one column of the color filter forming regions 11 is completed, the inkjet head 22 driven by the sub-scan driving unit 21 is transferred to the starting position of the next column of the color filter forming regions 11 (Step S19), and forms the filter elements in the filter element forming regions 7 by repeating the first-scanning, second-scanning, and discharging of ink relative to this column of the color filter forming regions 11 (Steps S13 to S16).

After the filter elements 3 of one color selected from among R, G, and B, for example, R, are formed in all of the color filter forming regions 11 in the mother substrate 12 (Y in Step S18), the treated mother substrate 12 is discharged by the substrate placing unit 23 or another transport mechanism in Step S20.

Subsequently, unless the operator commands termination of the process (N in Step S21), the ink discharging operation concerning R is repeated relative to another mother substrate 12, going back to Step S2.

When the operator commands the termination of the process (Y in Step S21), the CPU 69 transfers the inkjet head 22 to the position of the capping unit 76 in FIG. 8, and the inkjet head 22 is capped using the capping unit 76 (Step S22).

Patterning of a first color selected from among R, G, and B constituting the color filter, for example, R, is completed as above. Subsequently, the mother substrate 12 is transported to another inkjet apparatus 16 for applying the filter element material of a second color from among R, G, and B, for example, G, to perform the patterning of G, and finally to yet another inkjet apparatus 16 for applying the filter element material of a third color from among R, G, and B, for example, B, to perform the patterning of B. Thus, the mother substrate 12 including the plurality of color filters 1 (FIG. 5A) each having a desired dot-pattern of R, G, and B such as the striped pattern, is manufactured. The mother substrate 12 is cut according to the color filter regions 11 to yield individual color filters 1.

It is to be noted that when the color filter 1 is used for the color display in a liquid crystal device, electrodes, alignment layers, and the like are deposited on the surface of the color filter 1. In such a case, when individual color filters 1 are cut out from the mother substrate 12 prior to the deposition of the electrodes and the alignment of layers, the subsequent processes such as forming of electrodes and the like become cumbersome. Thus, in this case, instead of cutting the mother substrate 12 immediately after the completion of the color filters 1 on the substrate 12, the mother substrate 12 is preferably cut out after necessary additional processes such as the forming of electrodes and the alignment of layers are completed.

As described above, in accordance with the method and apparatus for manufacturing the color filter of this embodiment, each of the filter elements 3 in the color filter 1 shown in FIG. 5A is not formed by one first-scanning of the inkjet head 22 (refer to FIG. 1), but instead each of the filter elements 3 is formed into a predetermined thickness by being applied with ink n times, four times in this embodiment, from the plurality of nozzles 27 belonging to different nozzle groups. Accordingly, even when there is a variation between the discharged amount of ink among the plurality of nozzles 27, variations in the layer thickness among the plurality of filter elements 3 can be avoided, and light transmission characteristics of the color filter can thereby be made uniform.

It should be apparent that because the filter elements 3 are formed by discharging ink from the inkjet head 22 in the manufacturing method of this embodiment, complex processes such as those employing photolithography techniques are not required and the raw materials are efficiently consumed.

Figure 23A:
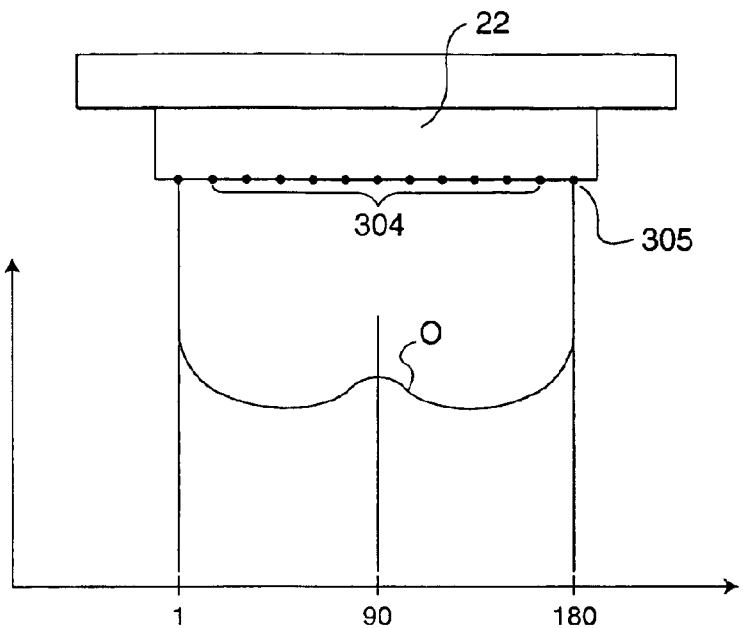
FIGS. 23A and 23B are diagrams for explaining the characteristics of a conventional color filter.
Figure 23B:
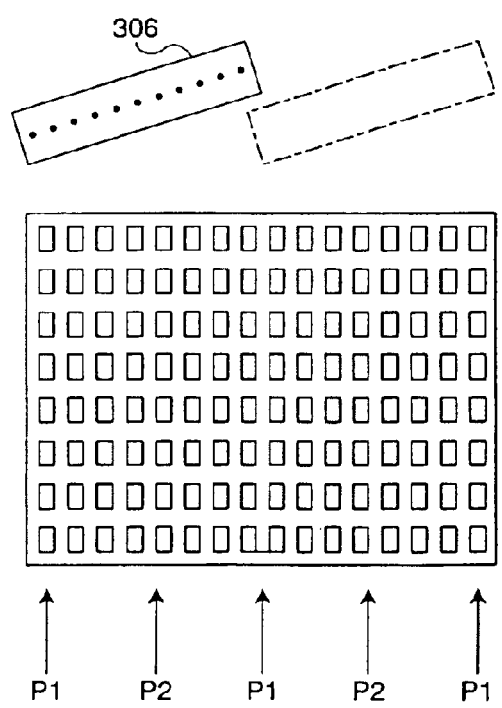

As described above in association with FIG. 23A, the plurality of nozzles 27 constituting the nozzle line 28 of the inkjet head 22 have an uneven distribution in the amount of ink discharged. As described above, some of the nozzles 27 located at the two end portions of the nozzle line 28, for example, 10 at each of the two end portions, discharges ink in a larger amount. From the point of view of achieving uniformity in the layer thickness of the discharged ink layers, i.e., the filter elements, it is not preferable to use nozzles discharging a larger amount of ink compared to other nozzles.

Figure 13:
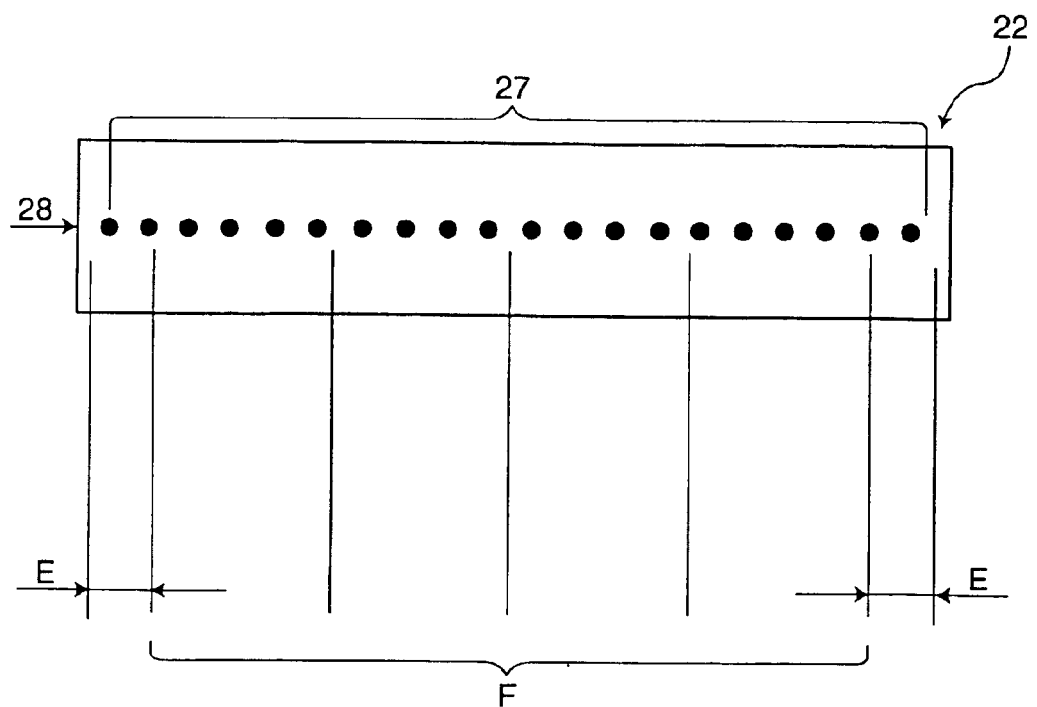
FIG. 13 is a plan view showing another modification of the inkjet head.

Thus, as shown in FIG. 13, preferably, some of the nozzles 27, for example, approximately 10, located in each of the two end portions E of the nozzle line 28 among all the nozzles 27 constituting the nozzle line 28 are set in advance so as not to discharge the ink, and the nozzles 27 located in the remaining portion F are divided into a plurality of groups, for example, four groups. The second-scanning motion is performed according to this nozzle group.

In this first embodiment, although a resin material having no translucency is used as the barrier 6, a resin material having translucency may also be used as the barrier 6. In such a case, a light-shielding metal layer or resin material may be disposed at the position corresponding to the space between the filter elements, such as on the barrier 6 or under the barrier 6, so as to form a black mask. Another configuration is forming the barrier 6 from translucent resin material and not installing a black mask.

Furthermore, in the first embodiment, although R, G, and B are used as the filter elements, cyan (C), magenta (M), and yellow (Y) may be used instead of R, G, and B. In such a case, filter element materials of C, M, and Y are used in place of the filter element materials of R, G, and B.

Moreover, in the first embodiment, although the barrier 6 is formed by photolithography, it is possible to form the barrier 6 by the inkjet method as with forming the color filter.

Figure 2:
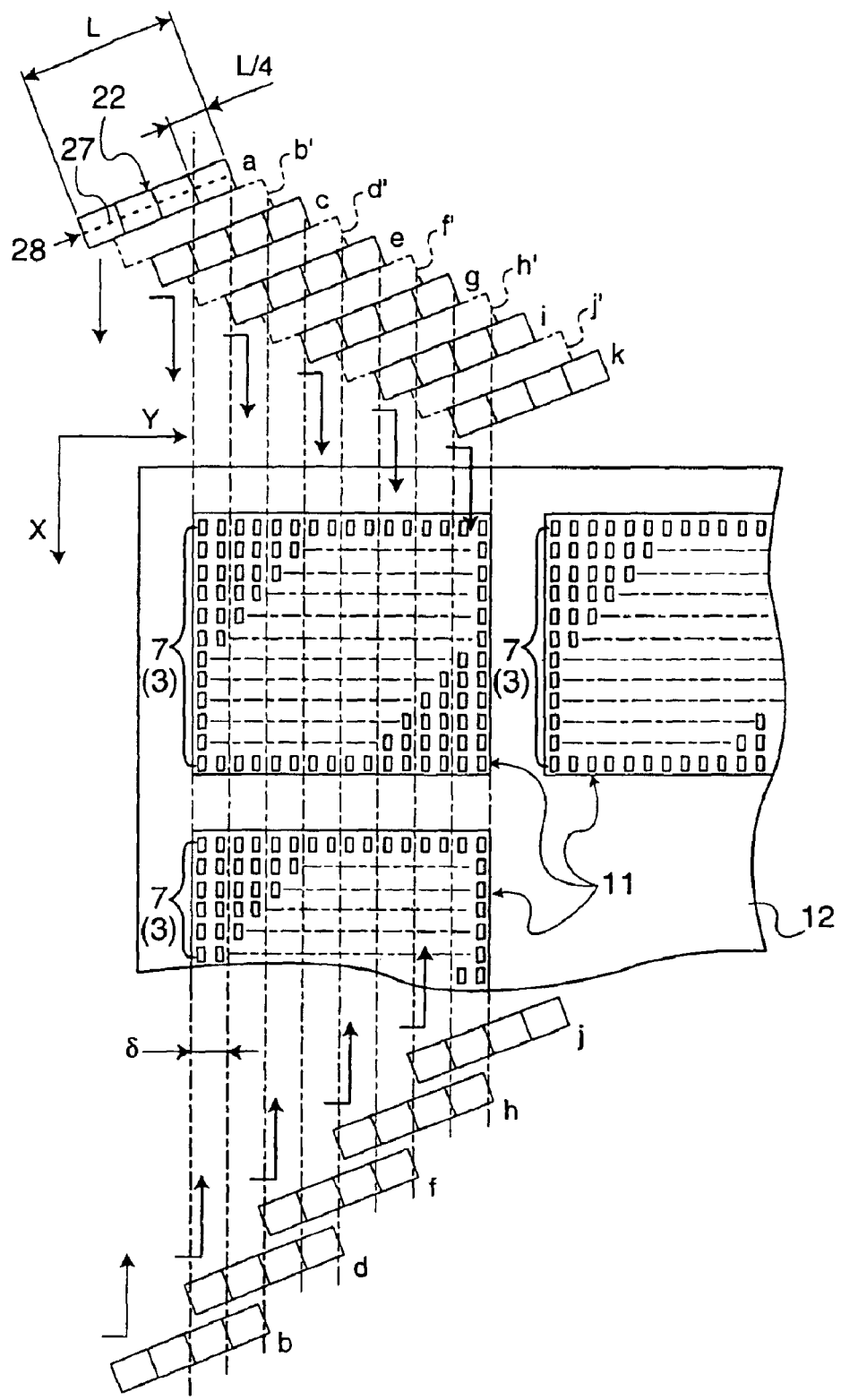
FIG. 2 is a plan view illustrating main steps of a method for making a color filter according to another embodiment of the present invention.

FIG. 2 illustrates a process of discharging ink, i.e., a filter element material, onto each of filter element forming regions 7 in each of color filter forming regions 11 in a mother substrate 12 using an inkjet head 22 according to another embodiment of a method and an apparatus for manufacturing a color filter of the present invention.

The outline of the process of this embodiment is the same as that shown in FIGS. 6A to 6D, and an inkjet apparatus for discharging ink has the same mechanism as the apparatus shown in FIG. 8. Moreover, a CPU 69 shown in FIG. 14 conceptually divide a plurality of nozzles 27 constituting a nozzle line 28 into n groups, for example, four groups, and a second-scanning distance δ is defined so as to correspond to a length L/n, i.e., L/4, of each of the nozzle groups, in the same manner as that regarding FIG. 1.

This embodiment differs from the foregoing embodiment shown in FIG. 1 in that a program software stored in a memory 71 in FIG. 14 is changed. In particular, a main scan control operation and sub scan control operation performed by the CPU 69 are changed.

To be more specific, in FIG. 2, the inkjet head 22 does not return to its initial position after it has finished its scanning motion in the first-scanning direction X, but instead moves in the second-scanning direction by a distance δ corresponding one nozzle group, i.e., to a position (b), immediately after it has finished the first-scanning motion in one direction. Subsequently, scanning motion in the direction opposite to the above-described one direction of the first-scanning direction X is performed, bringing the inkjet head 22 to position (b') which is the position shifted from position (a) in the second-scanning direction by the distance δ. It is needless to say that ink is selectively discharged from the plurality of nozzles 27 during the first-scanning from positions (a) to (b) and the first-scanning motion from positions (b) to (b').

In short, in this embodiment, the first-scanning and second-scanning of the inkjet head 22 are continuously performed one after the other without being interrupted by returning motions. Accordingly, the time required for the returning motion is no longer needed and operating time can be reduced.

Figure 3:
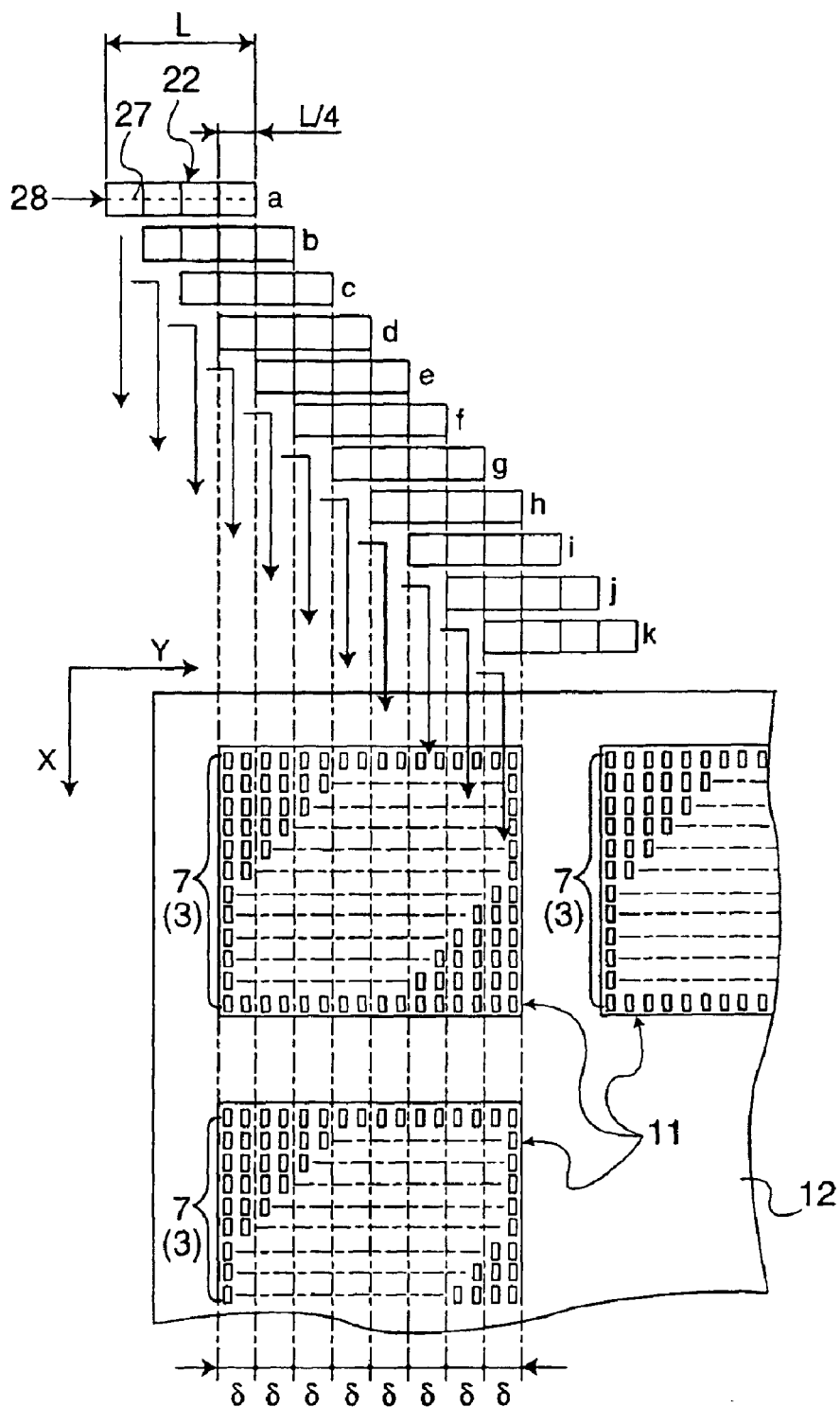
FIG. 3 is a plan view illustrating main steps of a method for making a color filter according to yet another embodiment of the present invention.

FIG. 3 illustrates a process of discharging ink, i.e., a filter element material, onto each of filter element forming regions 7 in each of color filter forming regions 11 in a mother substrate 12 using an inkjet head 22 according to another embodiment of a method and an apparatus for manufacturing a color filter of the present invention.

The outline of the process of this embodiment is the same as that shown in FIGS. 6A to 6D, and an inkjet apparatus for discharging ink has the same mechanism as the apparatus shown in FIG. 8. Moreover, a CPU 69 shown in FIG. 14 conceptually divides a plurality of nozzles 27 constituting a nozzle line 28 into n groups, for example, four groups as in FIG. 1.

This embodiment differs from the foregoing embodiment shown in FIG. 1 in that the nozzle line 28 of the inkjet head 22 is extended in a direction parallel to the second-scanning direction Y, as shown in position (a) in FIG. 3, when the inkjet head 22 is set to a plotting starting position of a mother substrate 12 in Step S12 shown in FIG. 15. Such an arrangement is advantageous when the nozzle pitch of the inkjet head 22 is equal to the element pitch of the mother substrate 12.

In this embodiment also, the inkjet head 22 repeats a scanning motion in the first-scanning direction X, returning motion to the initial position, and a second-scanning motion in the second-scanning direction Y by a distance δ starting at position (a) and ending at position (k), and selectively discharges ink, i.e., a filter element material, from the plurality of nozzles 27 during the first-scanning motions. Thus, the filter element material is applied to the interior of the filter element forming regions 7 of the color filter forming regions 11 in the mother substrate 12.

It is to be noted that in this embodiment, because the nozzle line 28 is positioned to be parallel to the second-scanning direction Y, the second-scanning distance δ is equal to the length of one nozzle group L/n, i.e., L/4.

Figure 4:
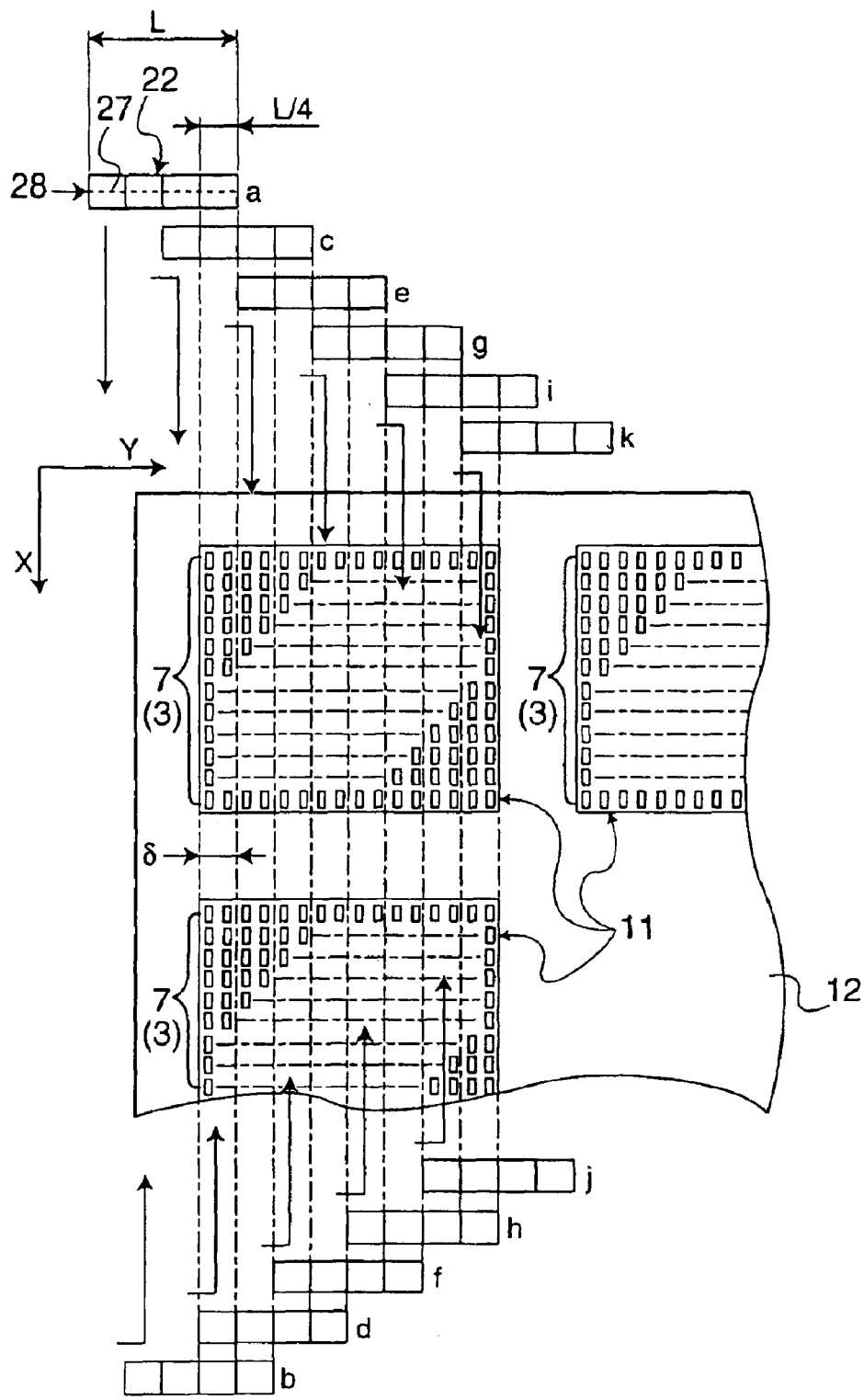
FIG. 4 is a plan view illustrating main steps of a method for making a color filter according to still another embodiment of the present invention.

FIG. 4 illustrates a process of discharging ink, i.e., a filter element material, onto each of filter element forming regions 7 of each of color filter forming regions 11 in a mother substrate 12 using an inkjet head 22 according to another embodiment of a method and an apparatus for manufacturing a color filter of the present invention.

The outline of the process of this embodiment is the same as that shown in FIGS. 6A to 6D, and an inkjet apparatus for discharging ink has the same mechanism as the apparatus shown in FIG. 8. Moreover, a CPU 69 shown in FIG. 14 conceptually divides a plurality of nozzles 27 constituting a nozzle line 28 into n groups, for example, four groups as in FIG. 1.

This embodiment differs from the foregoing embodiment shown in FIG. 1 in that the nozzle line 28 of the inkjet head 22 is extended in a direction parallel to the second-scanning direction Y, as shown by position (a) in FIG. 4, when the inkjet head 22 is set to a plotting starting position of a mother substrate 12 in Step S12 shown in FIG. 15 and that first-scanning and second-scanning of the inkjet head 22 are continuously performed one after the other without being interrupted by returning motions, as in the embodiment of FIG. 2.

Figure 11:
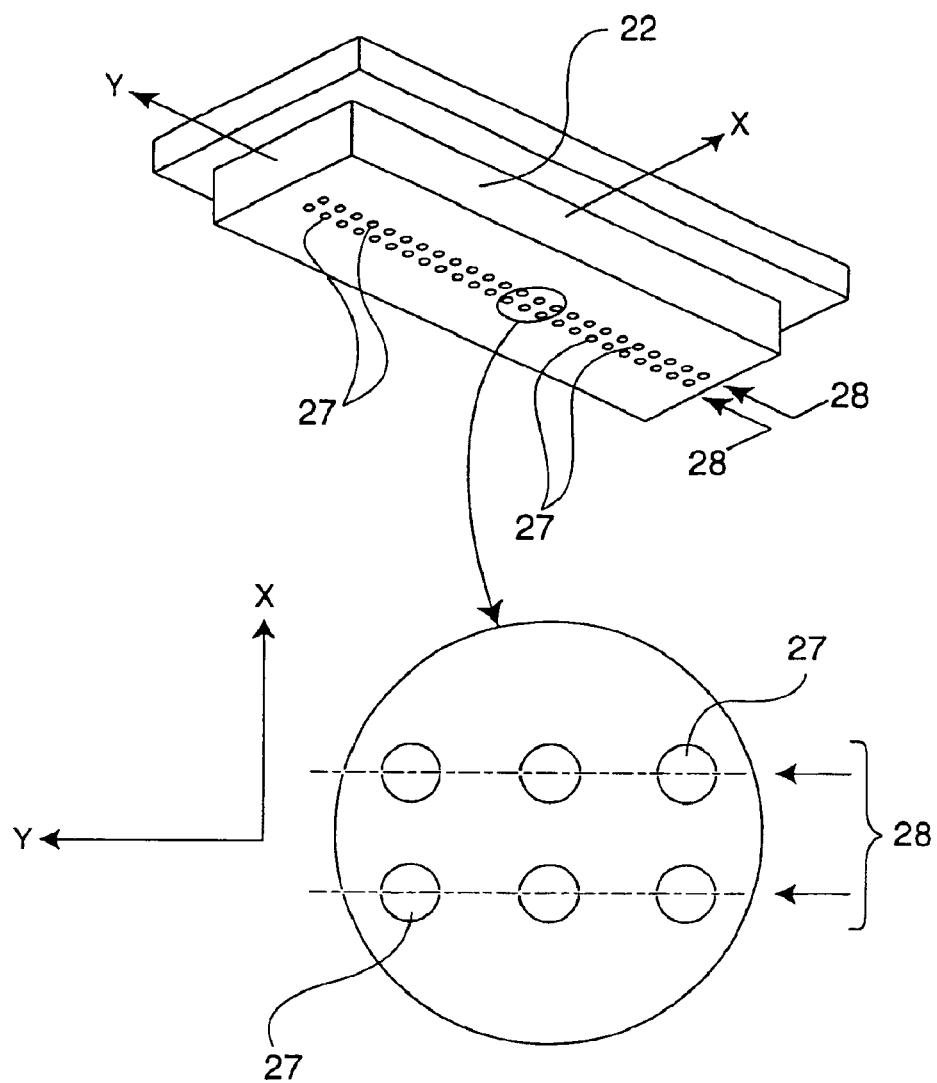
FIG. 11 is a perspective view showing a modification of the inkjet head.

Note that in this embodiment shown in FIG. 4 and the foregoing embodiment shown in FIG. 3, because the nozzle line 28 is extended in a direction orthogonal to the first-scanning direction X, each of the filter element regions 7 can be provided with a filter element material discharged from two of the nozzles 27 on the same first-scanning line when two nozzle lines 28 are provided along the first-scanning direction X, as shown in FIG. 11.

Figure 16:
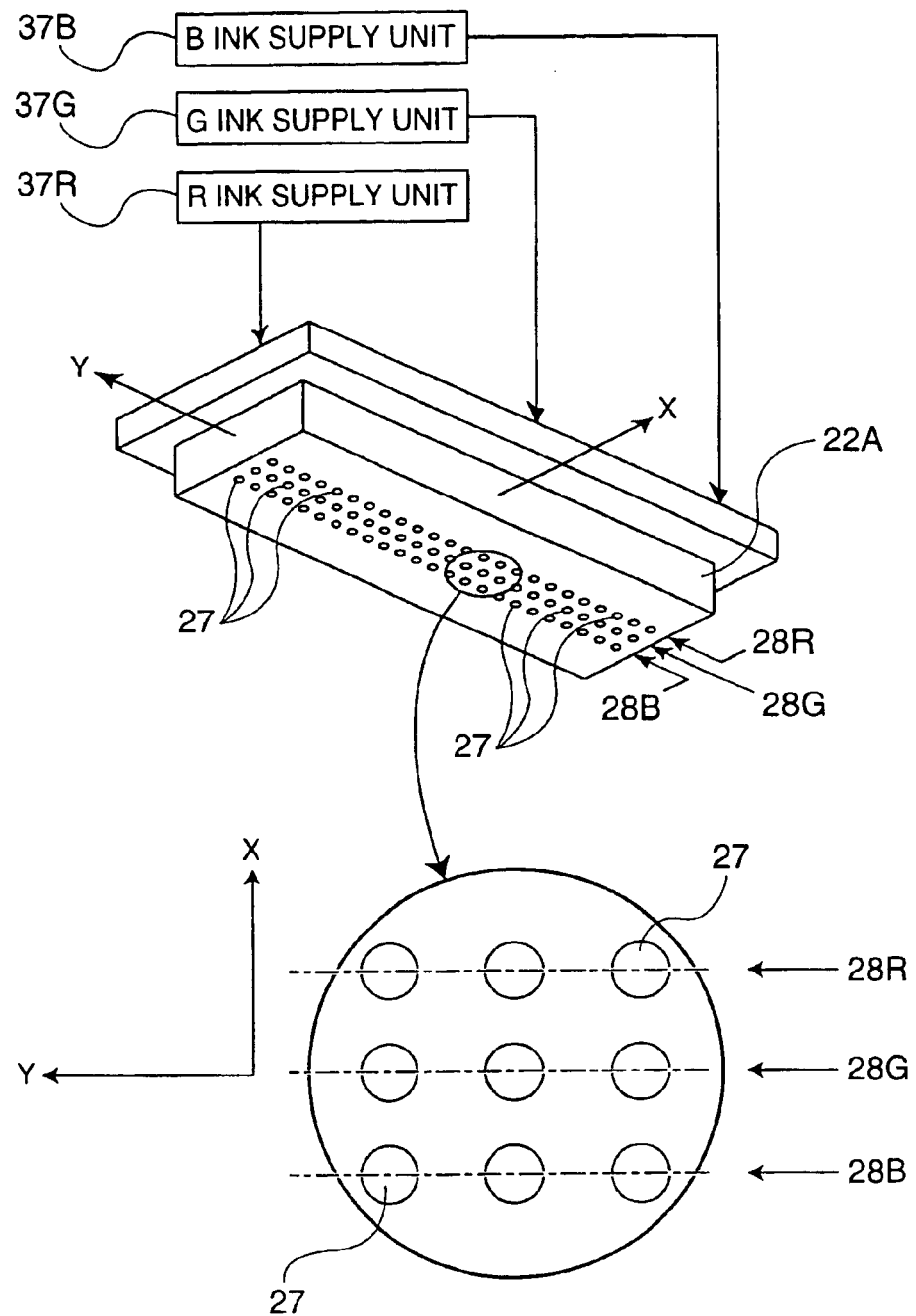
FIG. 16 is a perspective view showing yet another modification of the inkjet head.

FIG. 16 shows an inkjet head 22A employed in another embodiment of a method and an apparatus for manufacturing a color filter according to the present invention. The inkjet head 22A differs from the inkjet head 22 shown in FIG. 10 in that three types of nozzle lines, namely, a nozzle line 28R for discharging red ink, a nozzle line 28G for discharging green ink, and a nozzle line 28B for discharging blue ink, are formed in one inkjet head 22A and that each of the three types of nozzle lines is provided with an ink discharging system as shown in FIGS. 12A and 12B. Herein, the ink discharging system which corresponds to the red nozzle line 28R is connected to a red ink supply unit 37R, the ink discharging system which corresponds to the green nozzle line 28G is connected to a green ink supply unit 37G, and the ink discharging system which corresponds to the blue nozzle line 28B is connected to a blue ink supply unit 37B.

The outline of the process performed according to this embodiment is the same as the process shown in FIG. 6, and an inkjet apparatus for discharging ink is basically the same as the apparatus shown in FIG. 8. Furthermore, as in FIG. 1, a CPU 69 shown in FIG. 14 conceptually divides a plurality of nozzles 27 constituting the nozzle lines 28R, 28G, and 28B into n groups, for example, four groups, and the inkjet head 22A is moved in the second-scanning direction by a second-scanning distance δ according to these nozzle groups.

In the embodiment shown in FIG. 1, the inkjet head 22 has one type of nozzle line 28. Accordingly, it is necessary to separately prepare the inkjet heads 22, shown in FIG. 8, of three colors, i.e., R, G, and B, in order to make a color filter of R, G, and B. In contrast, when the inkjet head 22A having the structure shown in FIG. 16 is used, three colors, i.e., R, G, and B, can be simultaneously applied to a mother substrate 12 by one first-scanning of the inkjet head 22A in the first-scanning direction X, and it is sufficient to prepare only one inkjet head 22A. Moreover, by adjusting the nozzle line pitch of different colors to be the same as the pitch of the filter element regions on the mother substrate, simultaneous application of three colors, i.e., R, G, and B, is possible.

Figure 17:
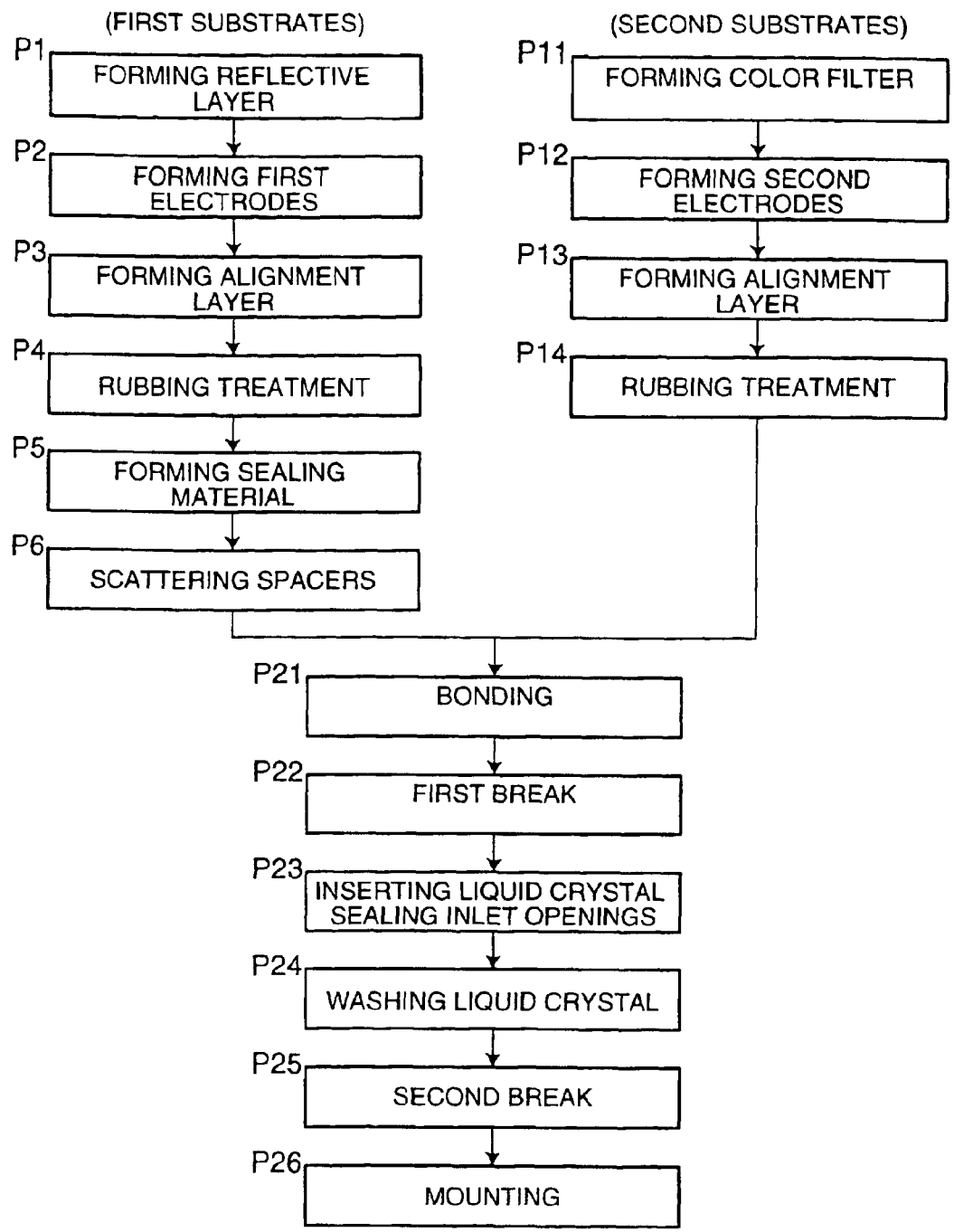
FIG. 17 is a diagram showing a method for making a liquid crystal device according to one embodiment of the present invention.
Figure 18:
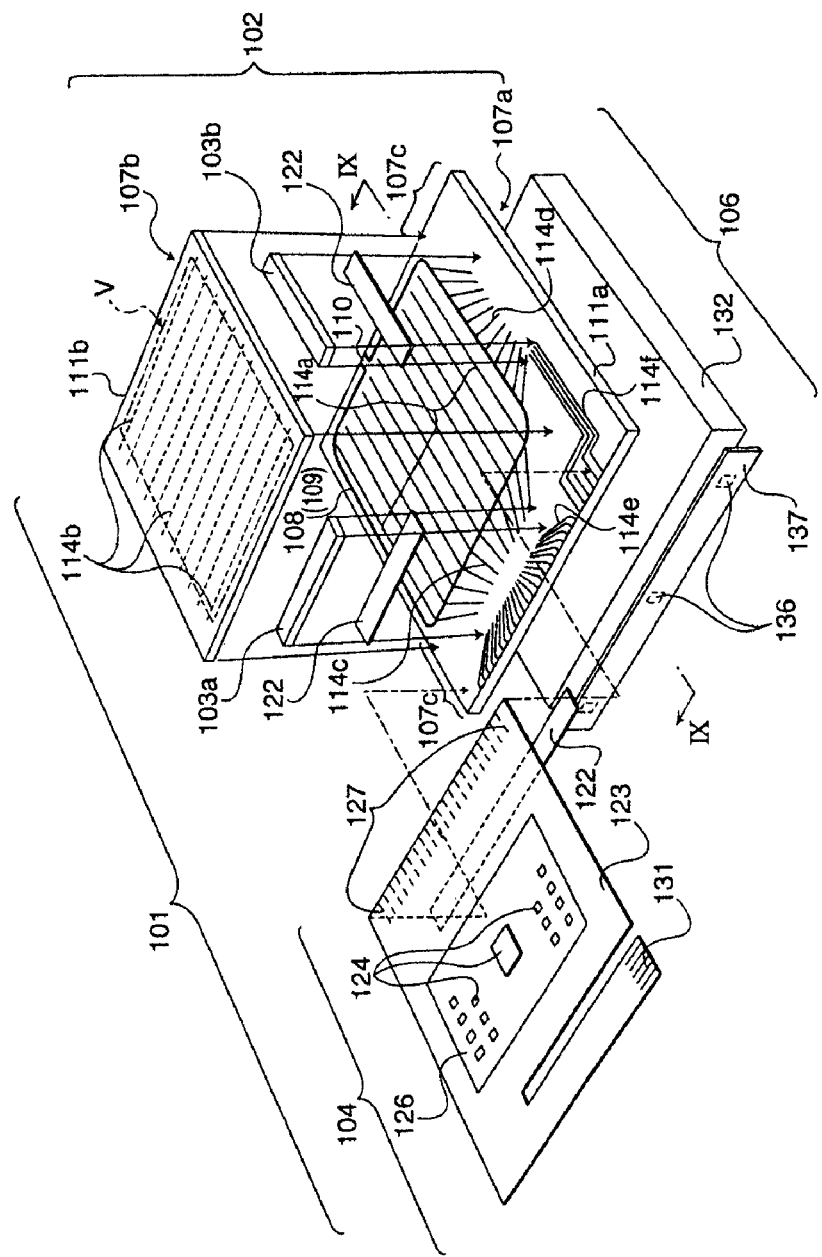
FIG. 18 is an exploded view showing an example of a liquid crystal device made by the method for making a liquid crystal device according to the present invention.
Figure 19:
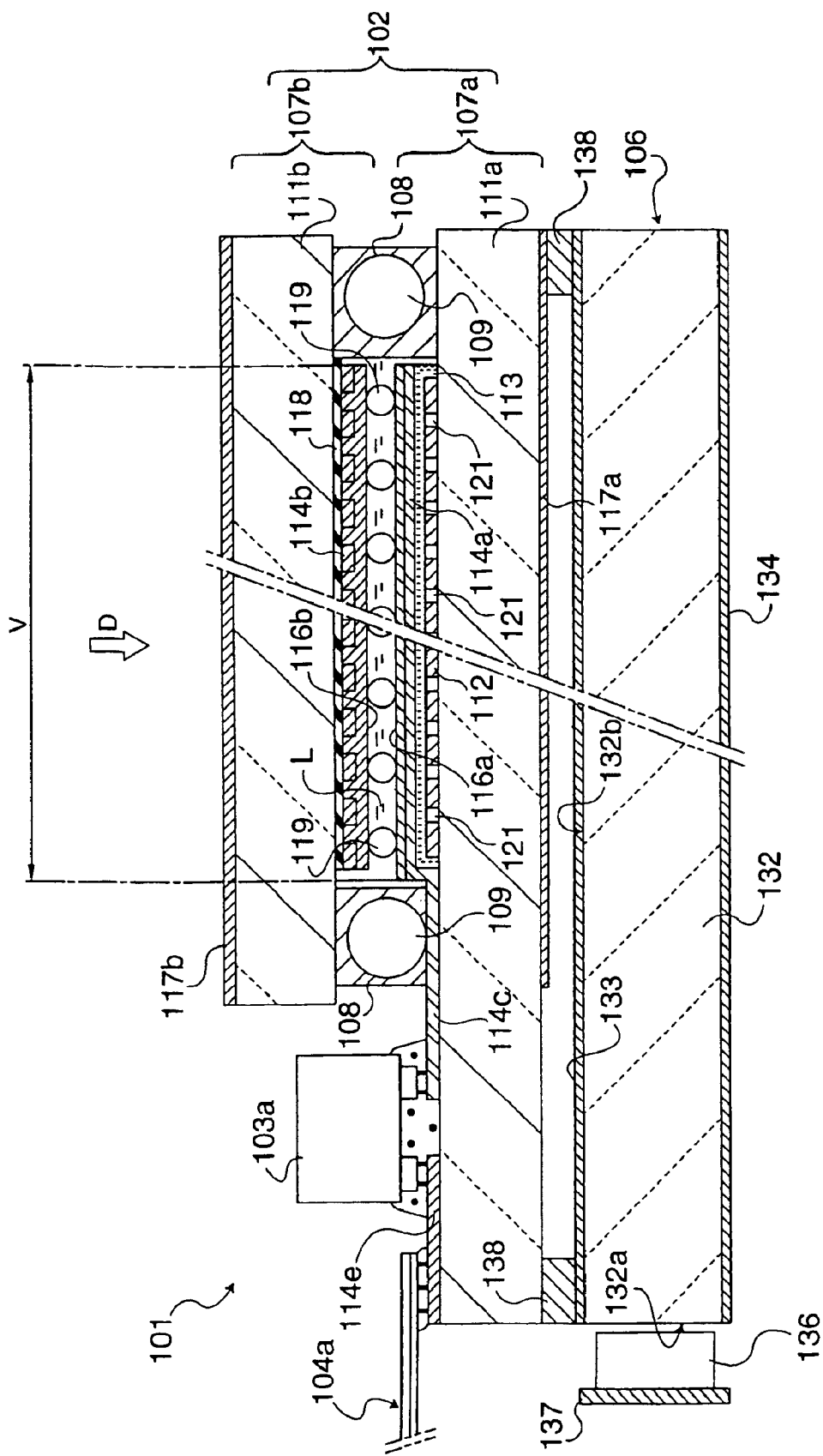
FIG. 19 is a cross-sectional view showing the structure of the liquid crystal device taken along line IX—IX in FIG. 18.

FIG. 17 shows an embodiment of a method for manufacturing a liquid crystal device according to the present invention. FIG. 18 shows an embodiment of the liquid crystal device manufactured by this manufacturing method. FIG. 19 is a cross-sectional view showing the structure of the liquid crystal device cut along line IX—IX in FIG. 18. Before describing the method and apparatus for manufacturing the liquid crystal device, an example of the liquid crystal device manufactured by this manufacturing method is explained first. Note that the liquid crystal device of this example is of a transflective type and achieves full color display by a simple matrix method.

Referring to FIG. 18, a liquid crystal device 101 is formed by mounting liquid crystal driver ICs 103a and 103b as semiconductor chips onto a liquid crystal panel 102, connecting a flexible printed circuit (FPC) 104 as an interconnecting element to the liquid crystal panel 102, and providing a lighting system 106 on the rear side of the liquid panel 102 for back-lighting.

The liquid crystal panel 102 is formed by bonding a first substrate 107a and a second substrate 107b using a sealing material 108. The sealing material 108 is formed, for example, by applying an epoxy resin on the inner surfaces of the first substrate 107a and the second substrate 107b at the peripheries thereof. Moreover, as shown in FIG. 19, circular or cylindrical conductive members 109 made of a conductive material are dispersed into the sealing material 108.

In FIG. 19, the first substrate 107a has a base plate 111a made of transparent glass, transparent plastic, or the like. A reflective layer 112 is formed on the inner surface (upper surface in FIG. 19) of the base 111a, an insulating layer 113 is deposited thereon, first electrodes 114a arranged in stripes when viewed from the direction of arrow D (refer to FIG. 18) are deposited thereon, and an alignment layer 116a is formed thereon. A polarizing plate 117a is installed on the outer surface (the lower surface in FIG. 19) of the base 111a by bonding or the like.

In FIG. 18, the gaps between the stripes are drawn wider than the actual width for the purpose of explaining the arrangement of the first electrodes 114a. Accordingly, the number of lines constituting the first electrodes 114a is fewer in the drawing. In actual application, the number of lines constituting the first electrodes 114a arranged on the base 111a is larger.

In FIG. 19, the second substrate 107b has a base plate 111b made of transparent glass, transparent plastic, or the like. A color filter 118 is formed on the inner surface (lower surface in FIG. 19) of the base 111b, second electrodes 114b arranged in stripes (refer to FIG. 18) when viewed from the direction of arrow D and extended in a direction orthogonal to the first electrodes 114a are formed thereon, and an alignment layer 116b is formed on the top thereof.

A polarizing plate 117b is installed onto the outer surface (the upper surface in FIG. 19) of the base 111b by bonding or the like.

In FIG. 18, the gaps between the stripes are drawn wider than the actual width for the purpose of explaining the arrangement of the second electrodes 114b, like the first electrodes 114a. Accordingly, the number of lines constituting the second electrodes 114b is fewer in the drawing. In actual application, the number of lines constituting the second electrodes 114b arranged on the base 111b is larger.

Referring to FIG. 19, liquid crystal, for example, super twisted nematic (STN) liquid crystal L, is enclosed in the space defined by the first substrate 107a, the second substrate 107b, and the sealing material 108, i.e., the cell gap. A large number of micro spherical spacers 119 are scattered on the surfaces of the first substrate 107a and the second substrate 107b, and the thickness of the cell gap is maintained uniform by the presence of these spacers 119 inside the cell gap.

The first electrodes 114a and the second electrodes 114b are aligned orthogonal to each other, and the intersections thereof are arranged in a dot-matrix when viewed from the direction of arrow D in FIG. 19. Each of the intersections in the dot-matrix constitutes one pixel. The color filter 118 is formed by arranging the red elements, green elements, and the blue elements in a predetermined pattern when viewed from the direction of arrow D, for example, a striped pattern, a deltoid pattern, a mosaic pattern, or the like. Each of the above-described pixels corresponds to one of R, G, and B, and one unit composed of three pixels of R, G, and B constitutes one pixel.

A plurality of pixels and pixels arranged in the dot-matrix selectively emits light to display images such as letters and numerical characters outside the second substrate 107b of the liquid crystal panel 102. The area at which such images are displayed is the effective pixel area. In FIGS. 18 and 19, rectangle-shaped planar areas indicated by arrows V are effective display areas.

Referring to FIG. 19, the reflective layer 112 is made of a light-reflecting material such as an APC alloy, Al, or the like, and openings 121 are formed at the positions corresponding to the pixels which are the intersections of the first electrodes 114a and the second electrodes 114b. As a result, the openings 121 are, like the pixels, arranged in a dot-matrix when viewed from the direction of arrow D in FIG. 19.

The first electrodes 114a and the second electrodes 114b are made of, for example, ITO, which is a transparent conductive material. Each of the alignment layers 116a and 116b is formed by applying a layer of a polyimide based resin having a uniform thickness. These alignment layers 116a and 116b are subjected to a rubbing treatment in order to determine an initial orientation of the liquid crystal molecules on the surfaces of the first substrate 107a and the second substrate 107b.

Referring to FIG. 18, the first substrate 107a is larger than the second substrate 107b, and the first substrate 107a has a substrate projecting portion 107c projecting outward from the second substrate 107b when these substrates are bonded using the sealing material 108. Various types of interconnecting lines such as lead lines 114c extending from the first electrodes 114a, lead lines 114d for connecting the second electrodes 114b disposed on the second substrate 107b via conductive members 109 (refer to FIG. 19) provided inside the sealing material 108, metal lines 114e connected to input bumps, i.e., input terminals, of the liquid crystal driver ICs 103a, metal lines 114f connected to the input bumps of the liquid crystal driver ICs 103b, and the like are each formed in an appropriate arrangement on this substrate projecting portion 107c.

In this embodiment, the lead lines 114c extending from the first electrodes 114a and the lead lines 114d connected to the second electrodes 114b are made of the same material as these electrodes, i.e., ITO or a conductive oxide. The metal lines 114e and 114f interconnecting the input sides of the liquid crystal driver ICs 103a and 103b are made of a metal material having a low electric resistance, for example, an APC alloy. The APC alloy is mainly composed of Ag and contains Pd and Cu as secondary components, for example the alloy contains 98 percent Ag, 1 percent Pd, and 1 percent Cu.

The liquid crystal driver IC 103a and the liquid crystal driver IC 103b are bonded to the surface of the substrate projecting portion 107c by anisotropic conductive films (ACF) 122 to be mounted thereon. In other words, in this embodiment, the liquid crystal panel is of a chip-on-glass (COG) type in which semiconductor chips are directly mounted onto the substrates. In this COG-type mount structure, the input bumps of the liquid crystal driver ICs 103a and 103b are connected to the metal lines 114e and 114f through conductive particles contained in the ACF 122, and the output bumps of the liquid crystal drivers 103a and 103b are conductively connected to the lead lines 114c and 114d.

Referring to FIG. 18, the FPC 104 has a flexible resin film 123, a circuit 126 comprising chip components 124, and metal line terminals 127. The circuit 126 is directly mounted onto the surface of the resin film 123 by a conductive connection method such as soldering or the like. The metal line terminals 127 are made of a conductive material such as an APC alloy, Cr, Cu, or the like. The region of the FPC 104 in which the metal line terminals 127 are formed is connected to the region of the first substrate 107a in which metal lines 114e and 114f are formed, through the ACF 122. The metal lines 114e and 114f at the substrate side are then connected to the metal line terminals 127 at the FPC 104 side by the conductive particles contained in the ACF 122.

External connection terminals 131 are formed at the peripheral portion opposite the EPC 104. The external connection terminals 131 are connected to an external circuit not shown in the drawing. Based on the signal transmitted from this external circuit, the liquid crystal driver ICs 103a and 103b are driven, and a scanning signal is supplied to one of and a data signal is supplied to the other of the first electrodes 114a and the second electrodes 114b. Thus, the voltage applied to each of the pixels arranged in the dot-matrix in the effective display area V is controlled according to the pixels, and, consequently, the alignment of the liquid crystal L is controlled according to the pixels.

Referring to FIG. 18, the lighting system 106 serving as what is known as a back light has, as shown in FIG. 19, a light guiding material 132 made of an acrylic resin or the like, a diffusing sheet 133 disposed on a light emitting face 132b, a reflecting sheet 134 disposed on the surface opposite the light emitting face 132b of the light guiding material 132, and light emitting diodes (LEDs) 136 which are the light source.

The LEDs 136 are supported by an LED substrate 137, and the LED substrate 137 is attached to a supporting member (not shown in the drawing), for example, integrally formed on the light guiding material 132. When the LED substrate 137 is attached to a predetermined position of the supporting member, the LED 136 is positioned so as to oppose a light capturing surface 132a which is a side face of the light guiding material 132. Note that reference numeral 138 denotes a buffer for buffering impact applied to the liquid crystal panel 102.

When the LEDs 136 emit light, the light is captured from the light capturing surface 132a, transmitted inside the light guiding material 132, and emitted through the diffusing sheet 133 as planar light from the light emitting face 132b, while being reflected by the reflecting sheet 134 and the walls of the light guiding material 132.

Because the liquid crystal device 101 has the above-described configuration, when ambient light such as sunlight or room light is sufficient, the ambient light is captured inside the liquid crystal panel 102 from the second substrate 107b side in FIG. 19, and the light transmitted through the liquid crystal L is reflected at the reflective layer 112 and supplied again to the liquid crystal L. The alignment of the liquid crystal L is controlled by the electrodes 114a and 114b sandwiching the same according to the pixels of R, G, and B. Thus, the light supplied to the liquid crystal L is modulated according to the pixels, and through such modulations, the liquid crystal panel 102 displays images such as letters and numerical characters composed of light passing through the polarizing plate 117b and light not passing through. Thus, a reflection-type display is achieved.

In contrast, when the ambient light is insufficient, the LEDs 136 emit light in order to emit planar light from the light emitting face 132*b*, and the light is supplied to the liquid crystal L via openings 121 formed in the reflective layer 112. During this time, like the reflection-type display, the supplied light is modulated by the liquid crystal L, the orientations thereof being controlled, according to the pixels to display images. Thus, a transmission-type display is achieved.

The liquid crystal device 101 having the above-described structure is manufactured, for example, by a manufacturing method shown in FIG. 17. In this manufacturing method, a series of steps P1 to P6 constitutes a process for making the first substrate 107*a* and a series of steps P11 to P14 constitutes a process for making the second substrate 107*b*. The process for making the first substrate and the process for making the second substrate are usually performed separately.

First, the process for making the first substrate is described. The reflective layers 112 for plural liquid crystal panels 102 are formed on the surface of a large-size mother material substrate made of translucent glass, translucent plastic, or the like, by photolithography or the like. The insulating layers 113 are then formed on the top thereof using a known deposition process (Step P1). Next, the first electrodes 114*a* and the lines 114*c*, 114*d*, 114*e*, and 114*f* are formed by photolithography or the like (Step P2).

Next, alignment layers 116*a* are formed on the first electrodes 114*a* by an applying process, a printing process, or the like (Step P3), and are subjected to a rubbing process in order to determine the initial alignment of the liquid crystal (Step P4). Next, the sealing material 108 are formed in a surrounding manner by means of screen printing or the like, for example (step P5), and the spherical spacers 119 are scattered thereon (Step P6). Thus, a large-size first mother substrate having a plurality of panel patterns of the first substrates 107*a* of the liquid crystal panels 102 is made.

The process for making the second substrate (Steps P11 to P14 in FIG. 17) is performed separately from the process for making the first substrate. First, a large-size mother material substrate made of translucent glass, translucent plastic, or the like is prepared, and the color filters 118 for the plural liquid crystal panels 102 are formed on the surface thereof (Step P111). The color filter is made by the manufacturing method shown in FIG. 6, and the R, G, B filter elements are formed according to the method for controlling the inkjet head shown in FIGS. 1 to 4 using the inkjet apparatus 16 shown in FIG. 8. Since the method for manufacturing the color filter and the method for controlling the inkjet head are the same as the foregoing description, the description thereof is omitted.

As shown in FIG. 6D, after the color filter 1, i.e., the color filter 118, is formed on the mother substrate 12, i.e., the mother material substrate, the second electrodes 114*b* are formed by photolithography (Step P12), the alignment layers 116*b* are formed by applying, printing, or the like (Step P13), and the alignment layers 116*b* are subjected to a rubbing treatment in order to determine the initial alignment of the liquid crystal (Step P114). Thus, a large-size second mother substrate having a plurality of panel patterns of the second substrates 107*b* of the liquid crystal panels 102 is made.

Subsequent to forming the large-size first and second mother substrates, the mother substrates are aligned with the sealing materials 108 therebetween and are bonded (Step P21). In this manner, an empty panel structure containing a plurality of panel portions of the liquid crystal panels and not yet being filled with liquid crystal is manufactured.

Next, scribe grooves, i.e., cutting grooves, are formed at predetermined positions of the resulting empty panel structure, and the panel structure is broken, i.e., cut, according to these scribe grooves (Step P22). In this manner, a strip of the empty panel structure having exposed liquid crystal inlet openings 110 (refer to FIG. 18) of the sealing material 108 of each liquid crystal panel is formed.

Next, liquid crystal L is injected into the interior of each liquid crystal panel portion through the exposed liquid crystal inlet openings 110, and the liquid crystal inlet openings are then sealed with resin or the like (Step P23). Typically, the liquid crystal is filled by, for example, filling a pooling container with liquid crystal, placing the pooling container containing the liquid crystal and the strip of empty panels into a chamber or the like, immersing the strip of empty panels into the liquid crystal inside the chamber or the like after evacuating the chamber or the like, and exposing the chamber to an atmospheric pressure. At this time, because the interiors of the empty panels are in a vacuum, the liquid crystal pressured by the atmospheric pressure flows into the interiors of the panels via the liquid crystal inlet openings. Since the liquid crystal adheres to the peripheries of the liquid panel structures after the filling of the liquid crystal, the strip of panels after the liquid crystal filling process is washed in Step P24.

Subsequently, scribe grooves are formed at predetermined positions on the strip of the mother panel after filling of the liquid crystal and washing, and the strip of panels is cut along these scribe grooves in order to cut out a plurality of liquid crystal panels (Step P25). The liquid crystal devices 101 are formed by mounting the liquid crystal driver ICs 103*a* and 103*b* onto each of the resulting liquid crystal panels 102, installing the lighting system 106 as the back light, and connecting the FPC 104 thereto (Step P26), as shown in FIG. 18.

The above described method and apparatus for manufacturing the liquid crystal devices have the following features especially during the process of the making color filters. The individual filter elements 3 in the color filter 1 shown in FIG. 5A, i.e., the color filter 118 shown in FIG. 19, are not formed by one first-scanning of the inkjet head 22 (refer to FIG. 1) but instead each of the filter elements 3 is formed into a predetermined layer thickness by n times of, for example, four times of, an ink-discharging operation using a plurality of nozzles 27 belonging to different nozzle groups. In this manner, variation in the layer thickness among the plurality of the filter elements 3 can be prevented even when there is a variation in the discharged amount of ink among the plurality of the nozzles 27, thereby making the in-plane light transmission characteristics of the color filter uniform. This means that the liquid crystal device 101 shown in FIG. 19 achieves vivid color display without color phase irregularities.

Moreover, in the method and apparatus for manufacturing liquid crystal devices of this embodiment, because the filter elements 3 are formed by discharging ink from the inkjet head 22 using the inkjet apparatus 16 shown in FIG. 8, complex processes such as those employing photolithography techniques are not required and raw materials are efficiently consumed.

Figure 20:
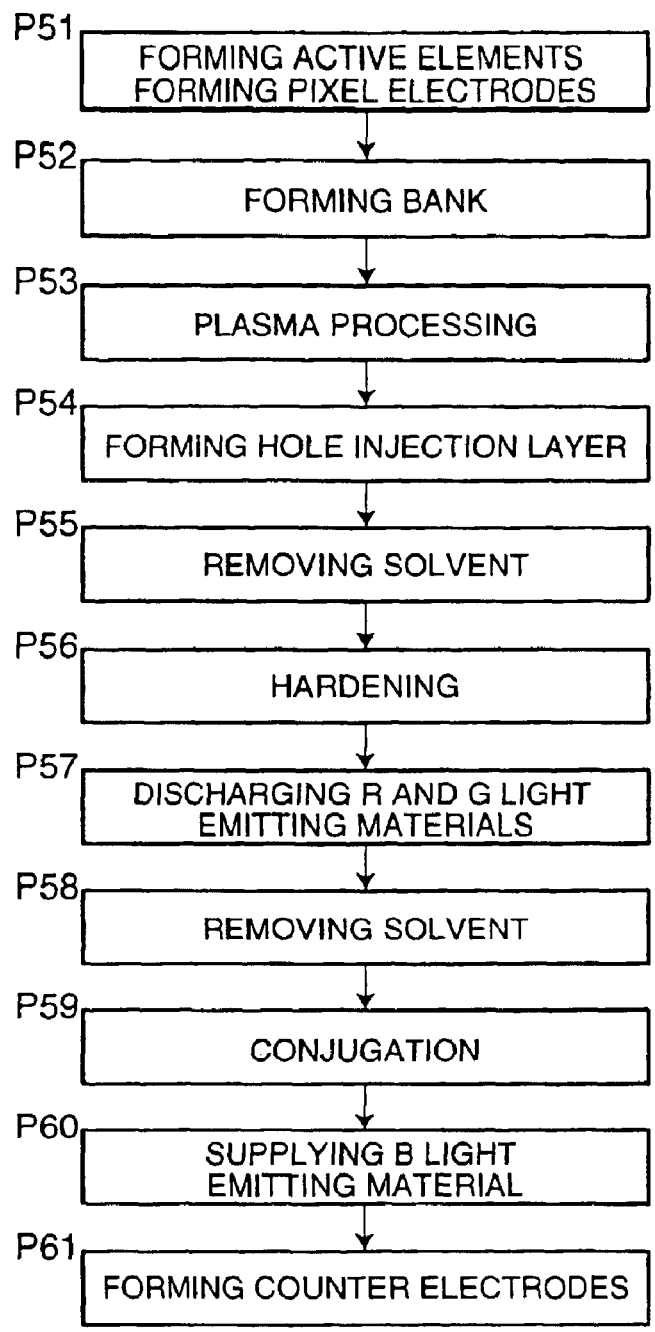
FIG. 20 is a diagram showing a method for making an electro-luminescent device according to one embodiment of the present invention.

FIG. 20 shows an embodiment of a method for manufacturing an electro-luminescent (EL) device according to the present invention. FIGS. 21A to 21D show the main steps of this manufacturing method and the cross-sectional views of the main structure of the EL device obtained through this method. As shown in FIG. 21D, an EL device 201 is made by forming pixel electrodes 202 on a transparent substrate 204, forming a bank 205 having a grid-like shape when viewed from the direction of arrow G between the pixel electrodes 202, forming hole injection layers 220 in the recesses of the grid, forming red light emitting layers 203R, green light emitting layers 203G, and blue light emitting layers 203B in the recesses of the grid in a predetermined pattern, such as a striped pattern, when viewed from the direction of arrow G, and forming counter electrodes 213 on the top thereof.

When the above described pixel electrodes 202 are driven by two-terminal active elements such as thin film diodes (TFDs), the counter electrodes 213 are arranged into a striped pattern when viewed from the direction of arrow G. When the pixel electrodes 202 are driven by three-terminal active elements such as thin film transistors (TFTs), the counter electrodes 213 are formed as a single plate electrode.

The region sandwiched by one of the pixel electrodes 202 and one of the counter electrodes 213 defines one pixel, and the pixels of three colors R, G, and B as one unit constitute one pixel. By controlling the electrical current flowing to each of the pixels, desired pixels from among the plurality of pixels can be selectively illuminated, and full color images can be displayed in the direction of arrow H.

The above-described EL device 201 can be manufactured through the manufacturing method shown in FIG. 20.

Figure 21A:
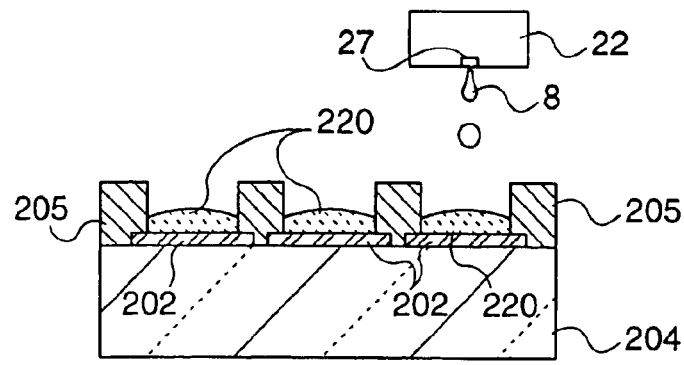
FIGS. 21A to 21D are cross-sectional views of the electroluminescent device corresponding to the diagram shown in FIG. 20.

More particularly, as shown in Step P51 and FIG. 21A, active elements such as TFDs and TFTs and then the pixel electrodes 202 are formed on the surface of the transparent substrate 204. Examples of the methods for forming these are a photolithography method, a vacuum deposition method, a sputtering method, and a pyrosol method. Examples of the materials for the pixel electrodes are indium tin oxide (ITO), tin oxide, and a compound oxide of indium oxide and zinc oxide.

Next, as shown in Step P52 and FIG. 21A, a barrier, i.e., the bank 205, is formed by a known patterning technique, for example, photolithography, so as to fill the gap between each of the pixel electrodes 202 with the bank 205. In this manner, contrast can be improved, luminescent materials can be prevented from being mixed with one another, and light is prevented from leaking through these gaps. Any type of material can be used for the bank 205 as long as the material is resistant to the solvent contained in the EL material. Preferably, a material which can be fluorinated by a fluorocarbon gas plasma process, for example, an organic material such as acrylic resin, epoxy resin, photosensitive polyimide, or the like is used.

Next, immediately before applying ink for hole injection layers, the substrate 204 is subjected to a continuous plasma processing using gaseous oxygen and fluorocarbon gas plasma (Step P53). Through this process, the surface of the polyimide becomes water-repellent, the surface of ITO becomes hydrophilic, and the wettability of the substrate required for fine patterning of the inkjet droplets can be controlled. The plasma generating apparatus may be of a vacuum type or an atmospheric type.

As shown in Step P54 and FIG. 21A, ink for hole injection layers is discharged from an inkjet head 22 of an inkjet apparatus 16 shown in FIG. 8, so as to form patterns on the pixel electrodes 202. As for the specific method for controlling the inkjet head, the method shown in FIGS. 1, 2, 3, or 4 is employed. After formation of the patterns, the solvent is removed by vacuum (1 torr) at room temperature for 20 minutes (Step P55), and subsequently, a heat treatment in atmospheric pressure at 20° C. (on a hot plate) for ten minutes is performed in order to form the hole injection layers 220 which are insoluble in the ink for luminous layers (Step P56). The layer thickness is 40 nm.

Figure 21B:
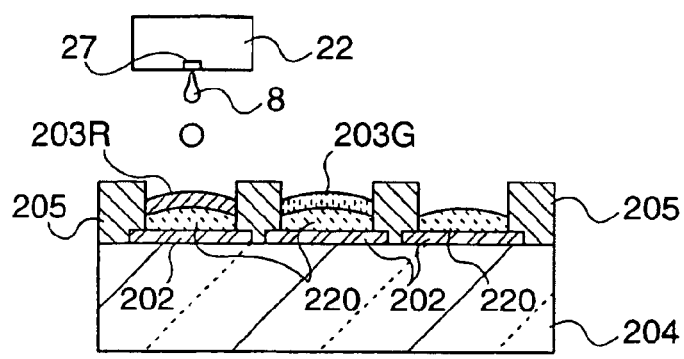

Next, as shown in Step P57 and FIG. 21B, ink for red light emitting layers and ink for green light emitting layers are applied using a inkjet method onto the hole injection layers 220 in the filter element regions. Here, each ink is discharged from the inkjet head 22 of the inkjet apparatus 16 shown in FIG. 8, and the inkjet head is controlled according to the process shown in FIGS. 1, 2, 3, or 4. By employing the inkjet method, fine patterning can be readily carried out within a short period of time. It also becomes possible to change the layer thickness by varying the concentration of the solid content in the ink composition and the discharging amount.

Next, the solvent contained in the applied ink for forming light emitting layers is removed by vacuum (1 torr) at room temperature for 20 minutes (Step P58), and the ink for forming light emitting layers is heat-treated in a nitrogen atmosphere at 150° C. for four hours to yield conjugation and to form the red light emitting layers 203R and the green light emitting layers 203G (Step P59). The thickness of each layer is 50 nm. The light emitting layers conjugated by heat treatment are insoluble in the solvent.

The continuous plasma processing using gaseous oxygen and fluorocarbon gas plasma may be performed on the hole injection layers 220 before forming the light emitting layers. In this manner, fluorine compounds are formed on the hole injection layers 220, the hole injection efficiency is increased due to higher ionizing potential, and organic EL devices having high light-emitting efficiency can be obtained.

Figure 21C:
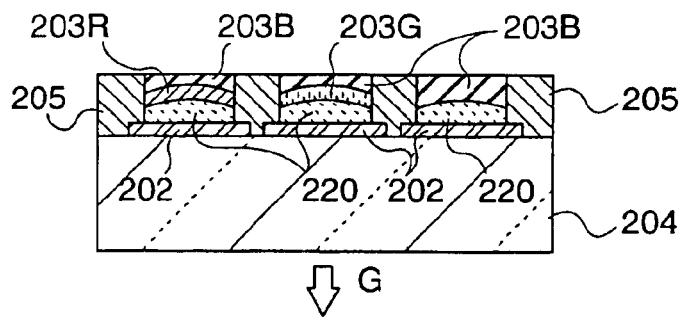
Figure 21D:
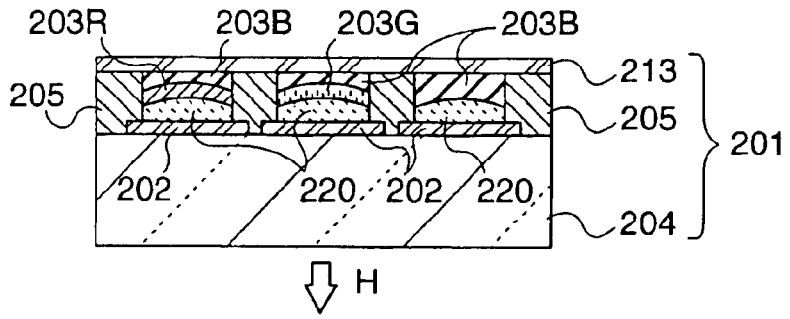
Figure 22A:
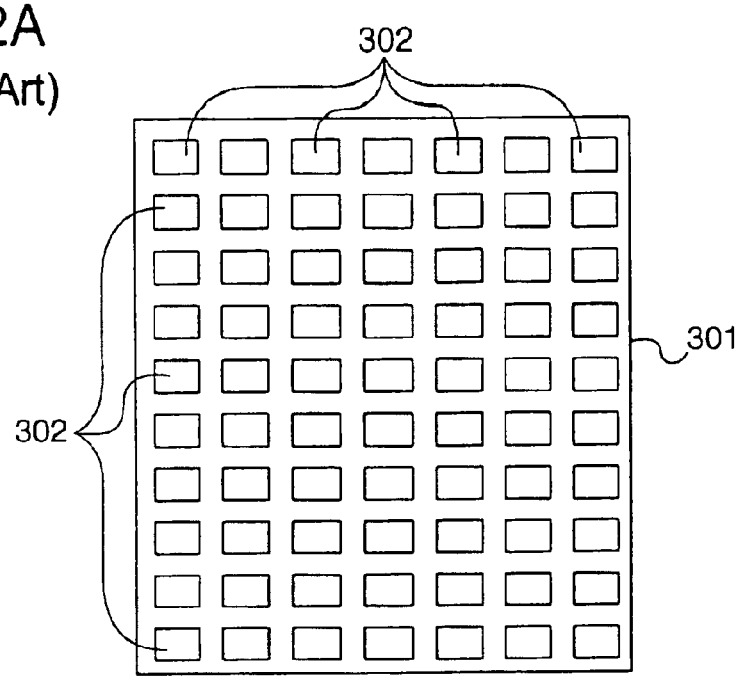
FIGS. 22A to 22C show an example of a conventional method for making a color filter.
Figure 22B:
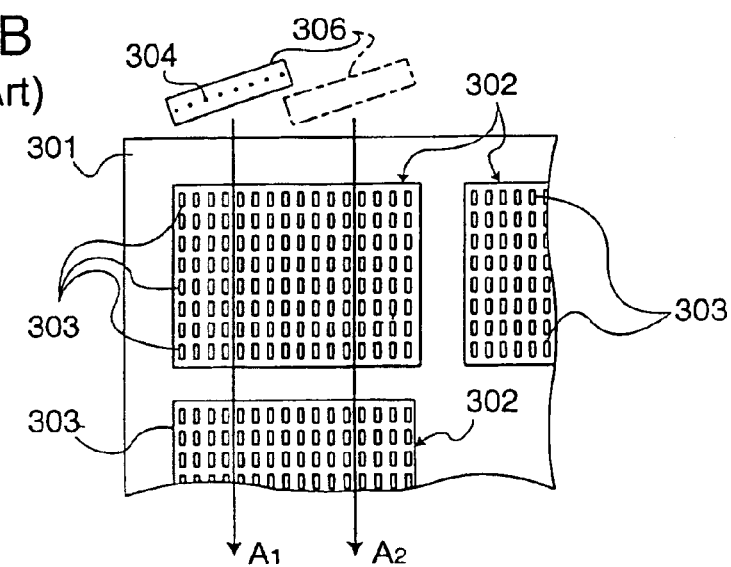
Figure 22C:
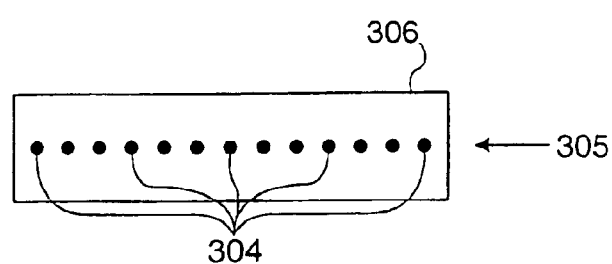

Next, as shown in Step P60 and FIG. 21C, the blue light emitting layers 203B are formed on the red light emitting layers 203R, the green light emitting layers 203G, and hole injection layers 220 inside the pixels. In this manner not only three primary colors are formed but also the differences between the bank 205 and the red light emitting layers 203R and between the bank 205 and the green light emitting layers 203G can be compensated for, thereby achieving planarization. Thus, short-circuit between the upper and lower electrodes can be securely avoided. By adjusting the layer thickness of the blue light emitting layers 203B, the blue light emitting layers 203B act as electron injection transport layers in the multilayer structure with the red light emitting layers 203R and the green color emitting layers 203G and do not emit blue light.

The blue light emitting layers 203B may be formed by, for example, a typical spin coating process which is a wet process or by an inkjet process similar to the process for forming the red light emitting layers 203R and green light emitting layers 203G.

Next, as shown in Step P61 and FIG. 21D, counter electrodes 213 are formed to make the EL device 201. When the counter electrodes 213 are single plate electrodes, the counter electrodes 213 can be formed by a deposition method such as a vapor deposition method and a sputtering method using, for example, Mg, Ag, Al, Li, or the like as the raw materials. When the counter electrodes 213 are arranged in a striped pattern, the counter electrodes 213 can be formed by patterning the deposited electrode layer; a patterning technique such as photolithography can be employed in such a case.

According to the method and apparatus for manufacturing the EL device described above, the inkjet head is controlled according to the controlling method shown in FIGS. 1, 2, 3, or 4. Thus, the hole injection layers 220 and the R, G, and B light emitting layers 203R, 203G, and 203B inside the pixels shown in FIGS. 21A to 21D are not formed by one first-scanning of the inkjet head 22 (refer to FIG. 1). Instead, the hole injection layers and/or each of the light emitting layers are formed into a predetermined thickness by receiving the discharge of ink n times, for example, four times, from the plurality of nozzles 27 belonging to different nozzle groups. Thus, even when there is a variation between the discharged amount of ink among the plurality of nozzles 27, variations in the layer thickness among the plurality of pixels can be avoided, and in-plane light transmission characteristics of the light emitting face of the EL device can be made uniform. This means that the liquid crystal device 201 shown in FIG. 21D achieves vivid color display without color phase irregularities.

Moreover, according to the method and apparatus for manufacturing the EL device of this embodiment, the R, G, and B pixels are formed by discharging ink from the inkjet head 22 of the inkjet apparatus 16 shown in FIG. 8. Thus, complex processes such as those employing photolithography techniques are not required and the raw materials are efficiently consumed.

Although particular preferred embodiments of the present invention have been described above in detail for illustrative purposes, the scope of the present invention is not limited to these embodiments. Various changes may be made without departing from the spirit and scope of the present invention.

For example, in the apparatus for manufacturing the color filter shown in FIGS. 8 and 9, the substrate 12 is main-scanned by the inkjet head 22 moving in the first-scanning direction X and is sub-scanned by the inkjet head 22 by moving the substrate 12 using the sub-scan driving unit 21. Instead, the first-scanning may be performed by moving the substrate and the second-scanning may be performed by moving the inkjet head 22.

Moreover, although the inkjet head which discharges ink utilizing the flexible deformation of the piezoelectric elements is employed in the above-described embodiments, it is to be understood that other types of inkjet head may also be employed.

Furthermore, although the most common configurations, where the first and second scanning directions cross at a right angle, are employed in the above-described embodiments, it should be appreciated that the angle is not restrictive and the scanning directions may cross at any angles. Moreover, although the methods and apparatus for making color filters, liquid crystal device, and electro-luminescent device are described in the above embodiments, the present embodiments are not restrictive and this invention may be embodied for any industrial technologies that form fine pattern on an object.

This invention may be used in forming various semi-conductor devices (i.e. thin film transistor or thin film diode), wiring pattern, or an insulating film.

Obviously many modifications and variations of the materials discharging from the head are possible in the light of element formed on objects. For example, conductive materials such as metal compounds, dielectric materials, silica glass precursors, or semi-conductor materials may be used for the discharging materials.

Further, in the above embodiments, although the name "a inkjet head" is used for clarification, it is obvious that materials discharged from the inkjet head are not limited to ink. The inkjet head may discharge the above-mentioned materials, such as conductive materials, dielectric materials, silica glass precursors, or semi-conductor materials.

The liquid crystal display and the electro-luminescent device are manufactured by the process described are used as display sections of electronic apparatuses such as cellular phones and portable computers.

In accordance with the above-described method and apparatus for making the color filter of the present invention, each of the filter elements in the color filter are not formed by one first-scanning of the inkjet head, but instead each of the filter elements are formed into a predetermined thickness by being applied with ink a number of times from the plurality of nozzles belonging to different nozzle groups. Accordingly, even when there is a variation between the discharged amount of ink among the plurality of nozzles, variations in the layer thickness among the plurality of filter elements can be avoided, and light transmission characteristics of the color filter can thereby be made uniform.

Moreover, because the inkjet head is used, complex processes such as those employing photolithography techniques are not required and the raw materials are efficiently consumed.

In accordance with the above-described method and apparatus for making the liquid crystal device, during the steps of making the color filter, each of the filter elements in the color filter are not formed by one first-scanning of the inkjet head, but instead each of the filter elements are formed into a predetermined thickness by being applied with ink a number of times from the plurality of nozzles belonging to different nozzle groups. Accordingly, even when there is a variation between the discharged amount of ink among the plurality of nozzles, variations in the layer thickness among the plurality of filter elements can be avoided, and light transmission characteristics of the color filter can thereby be made uniform. As a result, vivid color display without color phase irregularities can be achieved.

In accordance with the above-described method and apparatus for making the electro-luminescent device, each of the R, G, and B light emitting layers in the pixel is not formed by one first-scanning of the inkjet head, but instead each of the colored light emitting layers is formed into a predetermined thickness by being applied with the luminescent material a number of times from the plurality of nozzles belonging to different nozzle groups. Accordingly, even when there is a variation between the discharged amount of the luminescent material among the plurality of nozzles, variations in the layer thickness among the plurality of pixels can be avoided, and planar light emitting distribution characteristics of the light emitting face of the EL device can thereby be made uniform. As a result, vivid color display without color phase irregularities can be achieved.

Moreover, in accordance with the method and apparatus for making the electro-luminescent device, because the R, B, and G pixels are formed by discharging ink from the inkjet head, complex processes such as those employing photolithography techniques are not required and the raw materials are efficiently consumed.

In accordance with the controlling unit for controlling the inkjet head according to the present invention, each of the color patterns are not formed by one scanning of the inkjet head, but instead each of the each of the color patterns are formed into a predetermined thickness by being applied with ink a number of times from the plurality of nozzles belonging to different nozzle groups. Accordingly, even when there is a variation between the discharged amount of ink among the plurality of nozzles, variations in the layer thickness among the color patterns can be avoided, and light transmission characteristics of the color patterns can thereby be made uniform. As a result, the optical characteristics of color patterns can be made uniform at the plane of the optical component.

Thus, R, G, and B filter elements, serving as color patterns in the color filter, i.e., the optical component, of uniform thickness can be formed. Moreover, the thickness of the R, G, and B light emitting layers, i.e., the color patterns, and the hole injection layers of the electro-luminescent element, i.e., the optical component, can be made uniform.

While this invention has been described in conjunction with the specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An apparatus for making a color filter with a plurality of filter elements aligned on a substrate, comprising:

an inkjet head having a nozzle line comprising a plurality of nozzle groups, each of the nozzle groups including a plurality of nozzles;

an ink supplying element for supplying a filter material to the inkjet head;

a first-scan driving element for moving at least one of the inkjet head and the substrate in a first-scanning direction relative to the other;

a second-scan driving element for moving one of the inkjet head and the substrate in a second-scanning direction relative to the other;

a nozzle discharge controlling element for controlling the discharge of the filter material from the plurality of the nozzles;

a first-scan controlling element for controlling the operation of the first-scan driving element; and a second-scan controlling element for controlling the operation of the second-scan driving element, wherein the second-scan controlling element is configured to control the second-scan driving element to move at least one of the inkjet head and the substrate in a second-scanning direction relative to the other so that at least a part of each nozzle group scans a same section of the substrate in the first direction and at least one adjacent nozzle group of a nozzle group at the inkjet head scans a same section of a substrate previously scanned by the nozzle group of the inkjet head.

2. An apparatus for making a liquid crystal device, the liquid crystal device comprising:

a pair of substrates for enclosing liquid crystal; and a plurality of filter elements aligned on at least one of the substrates, and the apparatus comprising:

an inkjet head having a nozzle line comprising a plurality of nozzle groups, each of the nozzle groups including a plurality of nozzles;

an ink supplying element for supplying a filter material to the inkjet head;

a first-scan driving element for moving at least one of the inkjet head and the substrate in a first-scanning direction relative to the other;

a second-scan driving element for moving at least one of the inkjet head and the substrate in a second-scanning direction relative to the other;

a nozzle discharge controlling element for controlling the discharge of the filter material from the plurality of the nozzles;

a first-scan controlling element for controlling the operation of the first-scan driving element; and a second-scan controlling element for controlling the operation of the second-scan driving element, wherein the second-scan controlling element is configured to control the second-scan driving element to move at least one of the inkjet head and the substrate in a second-scanning direction relative to the other so that at least a part of each nozzle group scans a same section of the substrate in the first direction and at least one adjacent nozzle group of a nozzle group at the inkjet head scans a same section of a substrate previously scanned by the nozzle group of the inkjet head.

3. An apparatus for making an electro-luminescent device, the device comprising a plurality of pixels, each including an electro-luminescent layer, aligned on a substrate, and the apparatus comprising:

an inkjet head having a nozzle line comprising a plurality of nozzle groups, each nozzle group including a plurality of nozzles;

an ink supplying element for supplying a electro-luminescent material to the inkjet head;

a first-scan driving element for moving at least one of the inkjet head and the substrate in a first-scanning direction relative to the other;

a second-scan driving element for moving at least one of the inkjet head and the substrate in a second-scanning direction relative to the other;

a nozzle discharge controlling element for controlling the discharge of the filter material from the plurality of the nozzles;

a first-scan controlling element for controlling the operation of the first-scan driving element; and a second-scan controlling element for controlling the operation of the second-scan driving element, wherein the second-scan controlling element is configured to control the second-scan driving element to move at least one of the inkjet head and the substrate in a second-scanning direction relative to the other so that at least a part of each nozzle group scans a same section of the substrate in the first direction and at least one adjacent nozzle group of a nozzle group at the inkjet head scans a same section of a substrate previously scanned by the nozzle group of the inkjet head.

4. A control unit for controlling an inkjet head which is used in making an optical component having a plurality of color patterns aligned on a substrate, comprising:

an inkjet head having a nozzle line comprising a plurality of nozzle groups, each nozzle group including a plurality of nozzles;

an ink supplying element for supplying a electro-luminescent material to the inkjet head;

a first-scan driving element for moving at least one of the inkjet head and the substrate in a first-scanning direction relative to the other;

a second-scan driving element for moving at least one of the inkjet head and the substrate in a second-scanning direction relative to the other;

a nozzle discharge controlling element for controlling the discharge of the filter material from the plurality of the nozzles;

a first-scan controlling element for controlling the operation of the first-scan driving element; and a second-scan controlling element for controlling the operation of the second-scan driving element, wherein the second-scan controlling element is configured to control the second-scan driving element to move one of the inkjet head and the substrate in a second-scanning direction relative to the other so that at least a part of each nozzle group scans a same section of the substrate in the first direction and at least one adjacent nozzle group of a nozzle group at the inkjet head scans a same section of a substrate previously scanned by the nozzle group of the inkjet head.

5. An apparatus for discharging a material towards a object, comprising:

a head having a nozzle line comprising a plurality of nozzle groups, each of the nozzle groups including a plurality of nozzles;

an material supplying element for supplying a material to the head;

a first-scan driving element for moving at least one of the head and the object in a first-scanning direction relative to the other;

a second-scan driving element for moving at least one of the head and the substrate in a second-scanning direction relative to the other; and a nozzle discharge controlling element for controlling the discharge of the material from the plurality of the nozzles, wherein the second-scan driving element is configured to move at least one of the head and the object in a second-scanning direction relative to the other so that the nozzle group scans a same section of the object in the first direction and at least one adjacent nozzle group of a nozzle group at the head scans a same section of a substrate previously scanned by the nozzle group of the head.

* * * * *